(12) United States Patent
Ogawa et al.

(10) Patent No.: US 11,668,074 B2
(45) Date of Patent: Jun. 6, 2023

(54) ELECTRICALLY DRIVEN HYDRAULIC CONSTRUCTION MACHINE

(71) Applicant: Hitachi Construction Machinery Tierra Co., Ltd., Koka (JP)

(72) Inventors: Yuichi Ogawa, Koka (JP); Takeshi Ishii, Hino-cho (JP); Seiichi Kihara, Koka (JP); Kiwamu Takahashi, Moriyama (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 0 days.

(21) Appl. No.: 17/631,903

(22) PCT Filed: Sep. 14, 2020

(86) PCT No.: PCT/JP2020/034782
§ 371 (c)(1),
(2) Date: Feb. 1, 2022

(87) PCT Pub. No.: WO2021/060057
PCT Pub. Date: Apr. 1, 2021

(65) Prior Publication Data
US 2022/0290410 A1    Sep. 15, 2022

(30) Foreign Application Priority Data

Sep. 26, 2019  (JP) .............................. JP2019-175776

(51) Int. Cl.
*E02F 9/22*    (2006.01)
*B60L 1/00*    (2006.01)
*B60L 58/13*   (2019.01)
*B60L 58/14*   (2019.01)

(52) U.S. Cl.
CPC ............ *E02F 9/2296* (2013.01); *B60L 1/003* (2013.01); *B60L 58/13* (2019.02); *B60L 58/14* (2019.02);
(Continued)

(58) Field of Classification Search
CPC ........ F15B 2211/50518; F15B 2211/55; F15B 2211/665; E02F 9/2221; E02F 9/2246;
(Continued)

(56) References Cited

U.S. PATENT DOCUMENTS

2014/0117934 A1* 5/2014 Kurikuma ................ H02J 5/00
                                                    320/109
2014/0123847 A1   5/2014 Akiyama et al.
(Continued)

FOREIGN PATENT DOCUMENTS

CN      103732837 A      4/2014
JP      2009-281413 A    12/2009
(Continued)

OTHER PUBLICATIONS

Chinese-language Office Action issued in Chinese Application No. 202080052882.X dated Sep. 1, 2022 (six (6) pages).
(Continued)

*Primary Examiner* — Thomas E Lazo
(74) *Attorney, Agent, or Firm* — Crowell & Moring LLP

(57) ABSTRACT

To reduce an increase in the electric power consumption of an electric motor according to the state of an electric power source at the start of driving of an actuator, and make it possible to use devices in an appropriate state in an electrically driven hydraulic construction machine including a driving system that drives a hydraulic pump by using the electric motor. For this purpose, a controller 50 sets a target relief pressure of a relief valve 3 to a normal relief pressure Pn (first relief pressure) when an operation lever device 44 is not being operated and a storage amount SOC(t) of a battery 62 (the state quantity of an electric power source) is equal to or larger than a threshold S1, and sets the target relief pressure to a reduced relief pressure Pr(t) (second relief pressure) lower than the normal relief pressure Pn (Continued)

(first relief pressure) when the operation lever device 44 is not being operated, and the storage amount SOC(t) of the battery 62 (the state quantity of the electric power source) is smaller than the threshold S1.

8 Claims, 36 Drawing Sheets

(52) U.S. Cl.
CPC .......... *E02F 9/2221* (2013.01); *E02F 9/2246* (2013.01); *E02F 9/2267* (2013.01); *B60L 2200/40* (2013.01); *F15B 2211/50518* (2013.01); *F15B 2211/55* (2013.01); *F15B 2211/665* (2013.01)

(58) Field of Classification Search
CPC ....... E02F 9/2267; E02F 9/2296; B60L 1/003; B60L 58/13; B60L 58/14
See application file for complete search history.

(56) References Cited

U.S. PATENT DOCUMENTS

| | | | | |
|---|---|---|---|---|
| 2014/0227104 | A1* | 8/2014 | Takahashi | E02F 9/207 417/42 |
| 2014/0371995 | A1* | 12/2014 | Udagawa | E02F 9/2037 701/50 |
| 2019/0194910 | A1* | 6/2019 | Takahashi | E02F 9/22 |

FOREIGN PATENT DOCUMENTS

| | | |
|---|---|---|
| JP | 2011-149226 A | 8/2011 |
| JP | 5268338 B2 | 8/2013 |
| JP | 2014-202025 A | 10/2014 |
| JP | 2018-150728 A | 9/2018 |
| WO | WO 2018/168887 A1 | 9/2018 |

OTHER PUBLICATIONS

International Search Report (PCT/ISA/210) issued in PCT Application No. PCT/JP2020/034782 dated Nov. 24, 2020 with English translation (four (4) pages).

Japan-language Written Opinion (PCT/ISA/237) issued in PCT Application No. PCT/JP2020/034782 dated Nov. 24, 2020 (three (3) pages).

International Preliminary Report on Patentability (PCT/IB/338 & PCT/IB/373) issued in PCT Application No. PCT/JP2020/034782 dated Apr. 7, 2022, Including English translation of document C2 (Japanese-language Written Opinion (PCT/ISA/237), filed on Feb. 1, 2022) (five (5) pages).

* cited by examiner

FIG. 10

$$\mu VA = \frac{PQ}{60} \quad \cdots (1)$$

V: VOLTAGE [V] ON INPUT TERMINAL SIDE OF INVERTER 61
A: DIRECT CURRENT [A] ON INPUT TERMINAL SIDE OF INVERTER 61
P: PUMP DELIVERY PRESSURE [MPa]
Q: PUMP FLOW RATE [L/min]
μ: ENERGY CONVERSION EFFICIENCY $\Delta t$ : SAMPLING TIME

ELECTRICALLY DRIVEN HYDRAULIC CONSTRUCTION MACHINE

TECHNICAL FIELD

The present invention relates to an electrically driven hydraulic construction machine including a driving system that drives a hydraulic pump by using an electric motor.

BACKGROUND ART

An electrically driven hydraulic construction machine including a driving system that changes the driving source from an engine to an electric motor, and drives a hydraulic pump by using the electric motor is described in Patent Document 1, for example.

PRIOR ART DOCUMENT

Patent Document

Patent Document 1: WO2018/168887

SUMMARY OF THE INVENTION

Problem to be Solved by the Invention

Since the electrically driven hydraulic construction machine, in which the driving source is changed from the engine to the electric motor, described in Patent Document 1 does not discharge an exhaust gas, the electrically driven hydraulic construction machine provides merits that it places a smaller environment burden, and furthermore is quiet as compared with conventional hydraulic excavators that use an engine as the driving source. However, for example, when the delivery pressure of the hydraulic pump increases to a set pressure (relief pressure) of a relief valve due to travelling operation or the like, and the load torque of the hydraulic pump increases rapidly, a current supplied to the electric motor rapidly increases inevitably in order for the electric motor to output torque with a magnitude that is comparable to the increase in the load torque of the hydraulic pump. Where the electric power source is a battery, if the current is increased rapidly in a state in which the battery charge is low, deterioration of the battery is accelerated inevitably. In addition, where the electric power source is an external power source, since the voltage changes rapidly due to a rapid change in the current, there is a risk that devices cannot be used in an appropriate voltage range, and the devices cannot be appropriately actuated.

The present invention has been made in view of the problems mentioned above, and an object of the present invention is to provide an electrically driven hydraulic construction machine including a driving system that drives a hydraulic pump by using an electric motor, in which, at the start of driving of an actuator, an increase in the electric power consumption of the electric motor is reduced according to the state of an electric power source, and devices can be used in an appropriate state.

Means for Solving the Problem

In order to solve such a problem, according to the present invention, an electrically driven hydraulic construction machine includes: a hydraulic pump; an actuator driven by a hydraulic fluid delivered from the hydraulic pump; an operation lever device that instructs an operation speed and direction of the actuator; an operation state sensor that acquires operation state information about the operation lever device; a relief valve that is connected to a hydraulic line connecting the hydraulic pump with the actuator and discharges the hydraulic fluid in the hydraulic line to a tank when a pressure in the hydraulic line has reached a preset target relief pressure; and an electric motor that is supplied with electric power from an electric power source and drives the hydraulic pump, in which the electrically driven hydraulic construction machine further comprises a controller that changes the target relief pressure of the relief valve on the basis of the operation state information and a state quantity of the electric power source, and the controller is configured to set the target relief pressure to a first relief pressure when the operation lever device is not being operated and the state quantity of the electric power source is equal to or larger than a preset threshold, and to set the target relief pressure to a second relief pressure lower than the first relief pressure when the operation lever device is not being operated and the state quantity of the electric power source is smaller than the threshold.

In this manner, the controller sets the target relief pressure to the first relief pressure when the operation lever device is not being operated and the state quantity of the electric power source is equal to or larger than the preset threshold, and sets the target relief pressure to the second relief pressure lower than the first relief pressure when the operation lever device is not being operated and the state quantity of the electric power source is smaller than the threshold. Thereby, the delivery pressure of the hydraulic pump is allowed to increase only to the second relief pressure lower than the first relief pressure when the operation lever device is operated to start driving the actuator. Thus, at the start of driving of the actuator, an increase in the electric power consumption of the electric motor is reduced according to the state of the electric power source, and devices can be used in an appropriate state.

Advantages of the Invention

According to the present invention, at the start of driving of an actuator, an increase in the electric power consumption of an electric motor is reduced according to the state of an electric power source, and devices can be used in an appropriate state.

BRIEF DESCRIPTION OF THE DRAWINGS

FIG. 10 is a figure illustrating an expression of a relation between pump output power and inverter input electric power.

MODES FOR CARRYING OUT THE INVENTION

Hereinafter, embodiments of the present invention are explained according to the figures.

First Embodiment

<Configuration>

Figure 1:
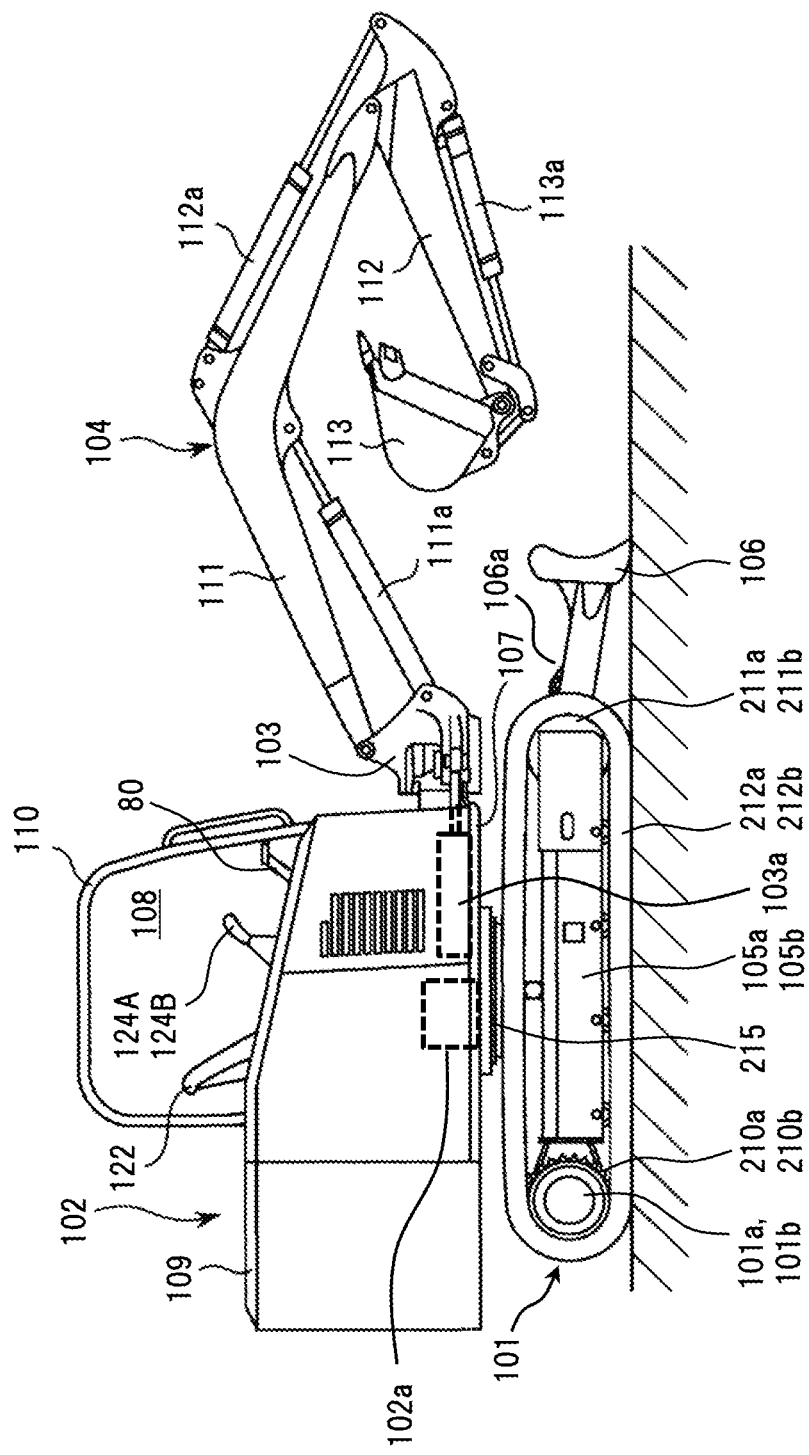
FIG. 1 is a figure illustrating the external appearance of an electrically driven hydraulic construction machine in one embodiment of the present invention.

FIG. 1 is a figure illustrating the external appearance of an electrically driven hydraulic construction machine in one embodiment of the present invention.

In the present embodiment, the electrically driven hydraulic work machine is an electrically driven hydraulic excavator. The electrically driven hydraulic excavator includes a lower travel structure 101, an upper swing structure 102, and a swingable front work implement 104. The front work implement 104 includes a boom 111, an arm 112, and a bucket 113. The boom 111, arm 112, and bucket 113 of the front work implement 104 can be pivoted vertically due to the extension and retraction of a boom cylinder 111a, an arm cylinder 112a, and a bucket cylinder 113a. The upper swing structure 102 and the lower travel structure 101 are rotatably connected to each other by a slewing ring 215, and the upper swing structure 102 can be swung by the rotation of a swing motor 102a relative to the lower travel structure 101. A swing post 103 is attached to a front section of the upper swing structure 102, and the front work implement 104 is attached to the swing post 103 vertically movably. The swing post 103 can be pivoted horizontally relative to the upper swing structure 102 due to the extension and retraction of the swing cylinder 103a, and right and left travel devices 105a and 105b, and a blade 106 that performs vertical operation due to the extension and retraction of a blade cylinder 106a are attached to the middle frame of the lower travel structure 101. The right and left travel devices 105a and 105b each include corresponding ones of driving wheels 210a and 210b, idlers 211a and 211b, and crawlers 212a and 212b, and are caused to travel by rotating right and left travel motors 101a and 101b, and driving the crawlers 212a and 212b via the driving wheels 210a and 210b.

A battery mounting section 109 that has a battery 62 (see FIG. 2) mounted therein, and doubles as a counterweight, and a cabin 110 having an operation room 108 formed therein are installed on a swing frame 107 of the upper swing structure 102. An operator's seat 122, right and left operation lever devices 124A and 124B for the boom cylinder 111a, the arm cylinder 112a, the bucket cylinder 113a, and the swing motor 102a, unillustrated operation lever devices for the swing cylinder 103a, the right and left travel motors 101a and 101b, and the blade cylinder 106a, a monitor 80, and the like are provided in the operation room 108.

The upper swing structure 102 is referred to as a machine body in the explanation below in some cases.

Figure 2:
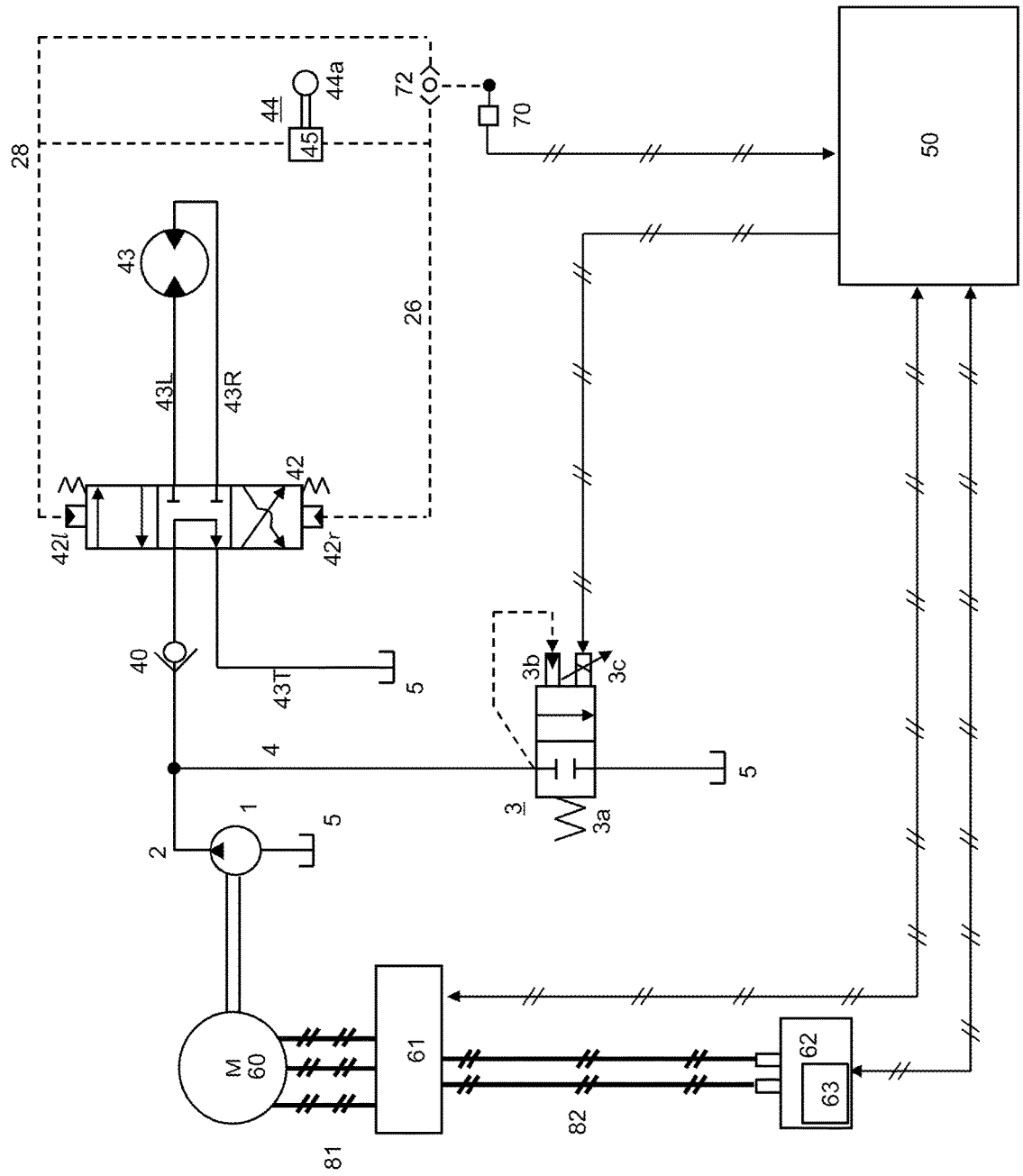
FIG. 2 is a figure illustrating a driving system included in the electrically driven hydraulic excavator in a first embodiment of the present invention.

FIG. 2 is a figure illustrating a driving system included in the electrically driven hydraulic excavator in a first embodiment of the present invention.

In FIG. 2, the driving system includes an electric motor 60, a hydraulic pump 1, a relief valve 3, a tank 5, a directional control valve 42, a check valve 40, a hydraulic motor 43, and an operation lever device 44.

The hydraulic pump 1 is a fixed displacement hydraulic pump and is driven by the electric motor 60. The hydraulic pump 1 is connected with the directional control valve 42 via a hydraulic line 2. A relief hydraulic line 4 is connected on the hydraulic line 2 on the upstream side of the directional control valve 42. The relief valve 3 is attached on the relief hydraulic line 4. The downstream side of the relief valve 3 is connected to the tank 5. The check valve 40 is connected on the hydraulic line 2 on the downstream side of the connection point between the hydraulic line 2 and the relief hydraulic line 4, and on the upstream side of the directional control valve 42. A hydraulic fluid can flow through the check valve 40 in the direction from the hydraulic pump 1 to the directional control valve 42, but cannot flow in the opposite direction.

The directional control valve 42 is connected to the hydraulic line 2 and is connected to: a left rotation hydraulic line 43L connected with a left rotation side chamber of the hydraulic motor 43; a right rotation hydraulic line 43R connected with a right rotation side chamber of the hydraulic motor 43; and a tank hydraulic line 43T connected with the tank 5.

The directional control valve 42 is driven by the pressure of an operation port 42l and the pressure of an operation port 42r. When the pressures of the operation ports 42l and 42r are both low, the directional control valve 42 is at the illustrated neutral position, the hydraulic line 2 is connected with the tank hydraulic line 43T, and the other hydraulic lines are interrupted. When the pressure of the operation port 42l is high, the directional control valve 42 is switched to the upper position in the illustration, the hydraulic line 2 is connected with the left rotation hydraulic line 43L, and the tank hydraulic line 43T is connected with the right rotation hydraulic line 43R. When the pressure of the operation port 42r is high, the directional control valve 42 is switched to the lower position in the illustration, the hydraulic line 2 is connected with the right rotation hydraulic line 43R, and the tank hydraulic line 43T is connected with the left rotation hydraulic line 43L.

The operation lever device 44 has an operation lever 44a and a pilot valve 45 attached to the operation lever 44a. The pilot valve 45 is connected to the operation port 42l of the directional control valve 42 via a pilot hydraulic line 28 and is connected to the operation port 42r of the directional control valve 42 via a pilot hydraulic line 26. An operating pressure according to the operation amount of the operation lever 44a is introduced from the pilot valve 45 to the operation port 42r or the operation port 42l of the directional control valve 42.

The hydraulic motor 43 is illustrated so as to represent one from among the boom cylinder 111a, the arm cylinder 112a, the bucket cylinder 113a, the swing motor 102a, the swing cylinder 103a, the right and left travel motors 101a and 101b and the blade cylinder 106a, which are a plurality of actuators illustrated in FIG. 1, and is one of the left and right travel motors 101a and 101b, for example. The same applies to the directional control valve 42 and the operation lever device 44 such that the directional control valve 42 is illustrated so as to represent one from among a plurality of directional control valves for the plurality of actuators illustrated in FIG. 1, and the operation lever device 44 is illustrated so as to represent one from among a plurality of operation lever devices including the operation lever devices 124A and 124B for the plurality of actuators illustrated in FIG. 1.

In addition, the hydraulic motor 43 is an actuator driven by the hydraulic fluid delivered from the hydraulic pump 1, and the operation lever device 44 is an operation lever device for giving an instruction for the operation speed and direction of the hydraulic motor 43 (actuator).

In addition, the driving system includes a controller 50, an inverter 61, the battery 62, a battery control controller 63, a pressure sensor 70 and a shuttle valve 72.

The battery 62 is a storage apparatus that stores electric power and is an electric power source that supplies the electric power to the electric motor 60. A direct current output from the battery 62 is input to the inverter 61 via an electric cable 82. The inverter 61 converts the input direct current into an alternating current, and outputs the alternating current that has been obtained through the conversion performed such that the electric motor 60 is rotated in accordance with a rotation speed command value transmitted from the controller 50. The output alternating current is input to the electric motor 60 via an electric cable 81. Output control of the battery 62, and calculation of the storage amount of the battery 62 are performed by the battery control controller 63.

The shuttle valve 72 is connected with the pilot hydraulic line 26 and the pilot hydraulic line 28, and a higher one of the pressures (operating pressures) of the hydraulic lines 26 and 28 is introduced to the pressure sensor 70, which is an operation state sensor. The pressure sensor 70 senses the higher one of the pressures (operating pressures) of the hydraulic lines 26 and 28 as operation state information about the operation lever device 44, and transmits a pressure signal to the controller 50. The pressure sensor 70 is an operation state sensor that acquires the operation state information about the operation lever device 44.

The controller 50 is electrically connected with the pressure sensor 70, and receives the pressure signal from the pressure sensor 70. In addition, the controller 50 is electrically connected also with the battery control controller 63, and transmits and receives information to and from the battery control controller 63 through communication. The storage amount of the battery 62 is transmitted from the battery control controller 63 to the controller 50. In addition, the controller 50 is electrically connected also with the inverter 61, and transmits and receives information to and from the inverter 61 through communication. A rotation speed command value of the electric motor 60 is transmitted from the controller 50 to the inverter 61.

The relief valve 3 is a variable relief valve including: a spring 3a that sets a normal relief pressure (first relief pressure); a pressure receiving section 3b that is provided on the side to counteract the spring 3a, and receives the introduced pressure of the hydraulic line 2 (the delivery pressure of the hydraulic pump 1); and a solenoid 3c that is provided on the same side as the pressure receiving section 3b, and lowers the normal relief pressure set by the spring 3a.

The relief valve 3 is a relief valve that is connected to the hydraulic line 2, which is one of hydraulic lines connecting the hydraulic pump 1 with the hydraulic motor 43 (actuator), and discharges the hydraulic fluid in the hydraulic line 2 to the tank 5 when the pressure of the hydraulic line 2 (the delivery pressure of the hydraulic pump 1) reaches a preset target relief pressure.

The controller 50 is electrically connected also with the solenoid 3c of the relief valve 3, and is configured to be able to reduce the normal relief pressure. Note that the controller 50 may transmit and receive information and command values other than the information described above. In addition, it is supposed in the present embodiment that the rotation speed command value transmitted to the inverter 61 is a constant value.

The controller 50 decides, on the basis of the pressure signal (operation state information) from the pressure sensor 70, whether or not the operation lever device 44 is being operated, and changes, on the basis of results of the decision, the target relief pressure of the relief valve 3 according to the storage amount of the battery 62 (the state quantity of the electric power source).

Details of the functionality described above of the controller 50 are explained below.

Figure 3:
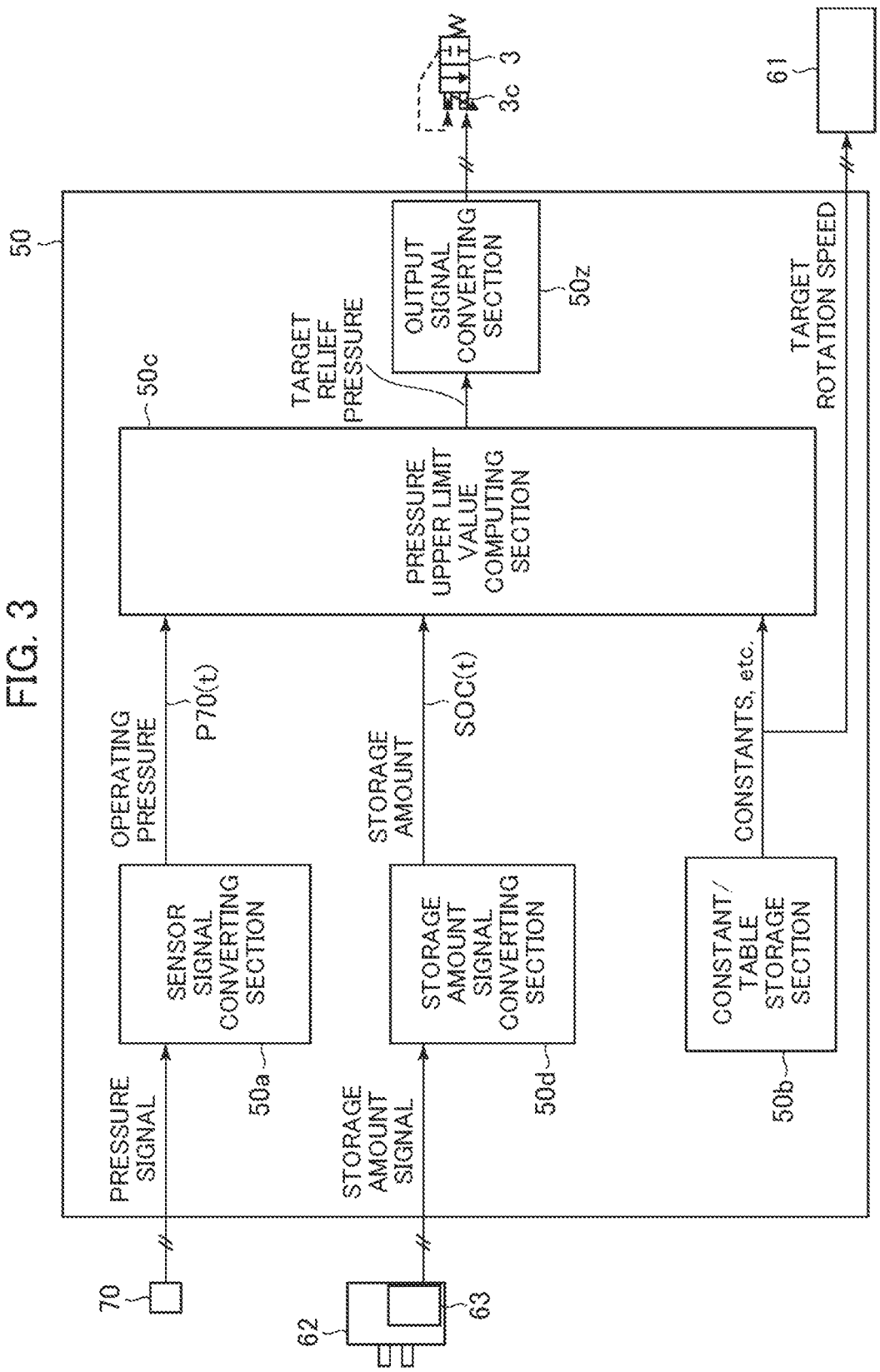
FIG. 3 is a block diagram illustrating functionalities of a controller in the first embodiment.

FIG. 3 is a block diagram illustrating functionalities of the controller 50 in the first embodiment.

The controller 50 includes a sensor signal converting section 50a, a storage amount signal converting section 50d, a constant/table storage section 50b, a pressure upper limit value computing section 50c and an output signal converting section 50z.

The sensor signal converting section 50a receives the pressure signal sent from the pressure sensor 70 (a signal of an operating pressure generated by the operation lever device 44), calculates an operating pressure $P70(t)$ on the basis of the pressure signal, and transmits the operating pressure $P70(t)$ to the pressure upper limit value computing section 50c.

The storage amount signal converting section 50d calculates, on the basis of a storage amount signal transmitted from the battery control controller 63, a storage amount SOC(t), and transmits the storage amount SOC(t) to the pressure upper limit value computing section 50c.

The constant/table storage section 50b has constants and tables necessary for calculations stored thereon, and transmits the constants and the tables to the pressure upper limit value computing section 50c. Note that the constants include a target rotation speed of the electric motor 60, and information about the target rotation speed is transmitted to the inverter 61.

The pressure upper limit value computing section 50c receives the operating pressure $P70(t)$ transmitted from the sensor signal converting section 50a, the storage amount SOC(t) transmitted from the storage amount signal converting section 50d, and the constant and table information transmitted from the constant/table storage section 50b, and computes the target relief pressure. Then, the pressure upper limit value computing section 50c outputs the target relief pressure to the output signal converting section 50z.

The output signal converting section 50z calculates output power by which the relief pressure of the relief valve 3 becomes the target relief pressure, and outputs the output power to the solenoid 3c of the relief valve 3.

Figure 4:
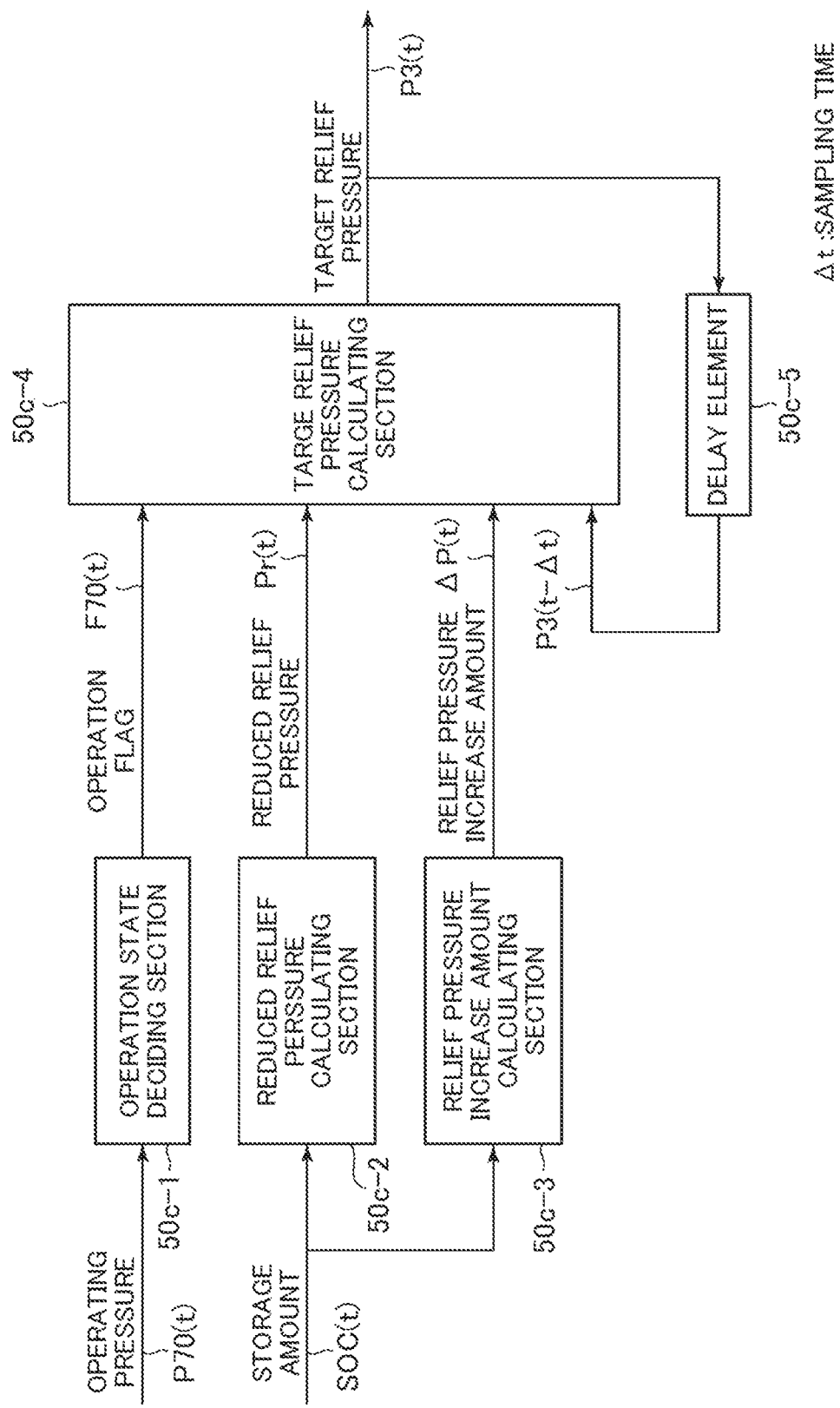
FIG. 4 is a block diagram illustrating functionalities of a pressure upper limit value computing section in the first embodiment.

FIG. 4 is a block diagram illustrating functionalities of the pressure upper limit value computing section 50c in the first embodiment. Note that the sampling time (computation cycle) of the controller 50 is $\Delta t$, and computations of a pressure upper limit value (target relief pressure) are executed repeatedly for each sampling time $\Delta t$.

The pressure upper limit value computing section 50c has an operation state deciding section 50c-1, a reduced relief pressure calculating section 50c-2, a relief pressure increase amount calculating section 50c-3, a target relief pressure calculating section 50c-4, and a delay element 50c-5.

The operation state deciding section 50c-1 decides, on the basis of the operating pressure $P70(t)$, whether the operation lever 44a is being operated, and outputs an operation flag $F70(t)$. When it is decided that the operation lever 44a is being operated, the operation flag $F70(t)$ is set to true (enabled), and when it is decided that the operation lever 44a is not being operated, the operation flag $F70(t)$ is set to false (disabled). Information about the operation flag $F70(t)$ is transmitted to the target relief pressure calculating section 50c-4.

The reduced relief pressure calculating section 50c-2 calculates, on the basis of a calculation method mentioned later, a reduced relief pressure Pr(t) from the storage amount SOC(t). Information about the reduced relief pressure Pr(t) is transmitted to the target relief pressure calculating section 50c-4.

The relief pressure increase amount calculating section 50c-3 calculates, on the basis of a calculation method mentioned later, a relief pressure increase amount $\Delta P(t)$ from the storage amount SOC(t). Information about the relief pressure increase amount $\Delta P(t)$ is transmitted to the target relief pressure calculating section 50c-4.

The target relief pressure calculating section 50c-4 calculates and outputs a target relief pressure $P3(t)$ on the basis of the operation flag $F70(t)$, the reduced relief pressure Pr(t) and the relief pressure increase amount $\Delta P(t)$, and a target relief pressure $P3(t-\Delta t)$ which has been sensed one sampling time $\Delta t$ before and is the current value of the target relief pressure $P3(t)$.

Figure 5:
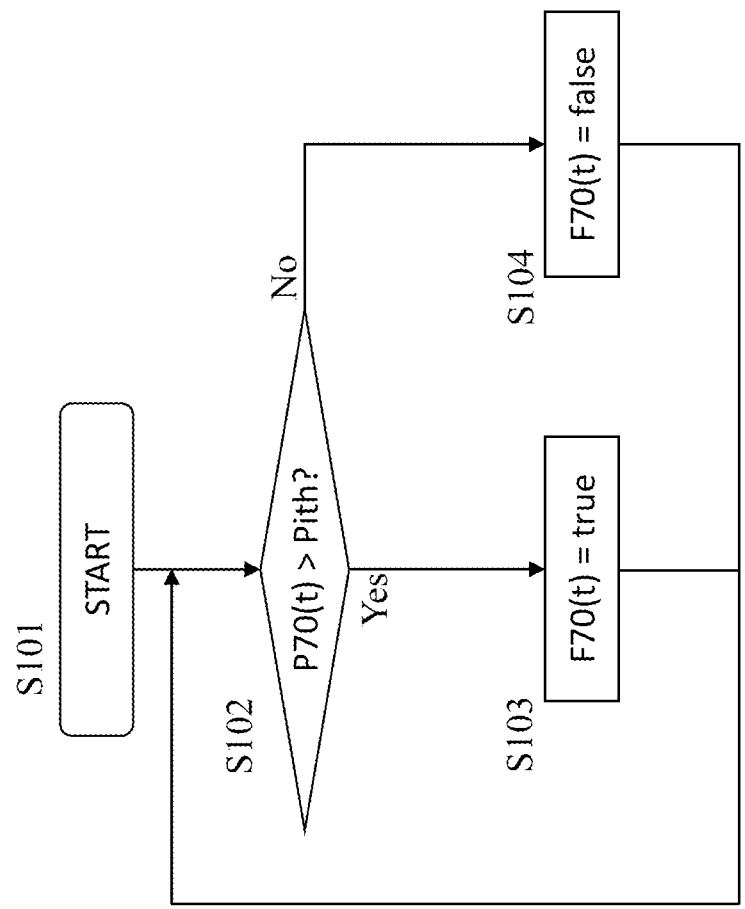
FIG. 5 is a flowchart illustrating a computation flow of an operation state deciding section.

FIG. 5 is a flowchart illustrating a computation flow of the operation state deciding section 50c-1, and the computation flow is executed repeatedly for each sampling time $\Delta t$ while the controller 50 is being operated.

At Step S101, a computation by the operation state deciding section 50c-1 is started.

At Step S102, the operation state deciding section 50c-1 decides whether the operating pressure $P70(t)$, which is the value of the operating pressure, is higher than a threshold Pith. When the operating pressure $P70(t)$ is higher than the threshold Pith, the result of the decision is Yes, and the procedure proceeds to a process at Step S103. When the operating pressure $P70(t)$ is equal to or lower than the threshold Pith, the result of the decision is No, and the procedure proceeds to a process at Step S104.

At Step S103, the operation state deciding section 50c-1 decides that the operation lever 44a is being operated, sets the operation flag $F70(t)$ to true (enables the operation flag $F70(t)$), and transmits information about the operation flag $F70(t)$ to the target relief pressure calculating section 50c-4.

At Step S104, the operation state deciding section 50c-1 decides that the operation lever 44a is not being operated, and sets the operation flag $F70(t)$ to false (disables the operation flag $F70(t)$). Then, the operation state deciding section 50c-1 transmits information about the operation flag $F70(t)$ to the target relief pressure calculating section 50c-4.

Figure 6:
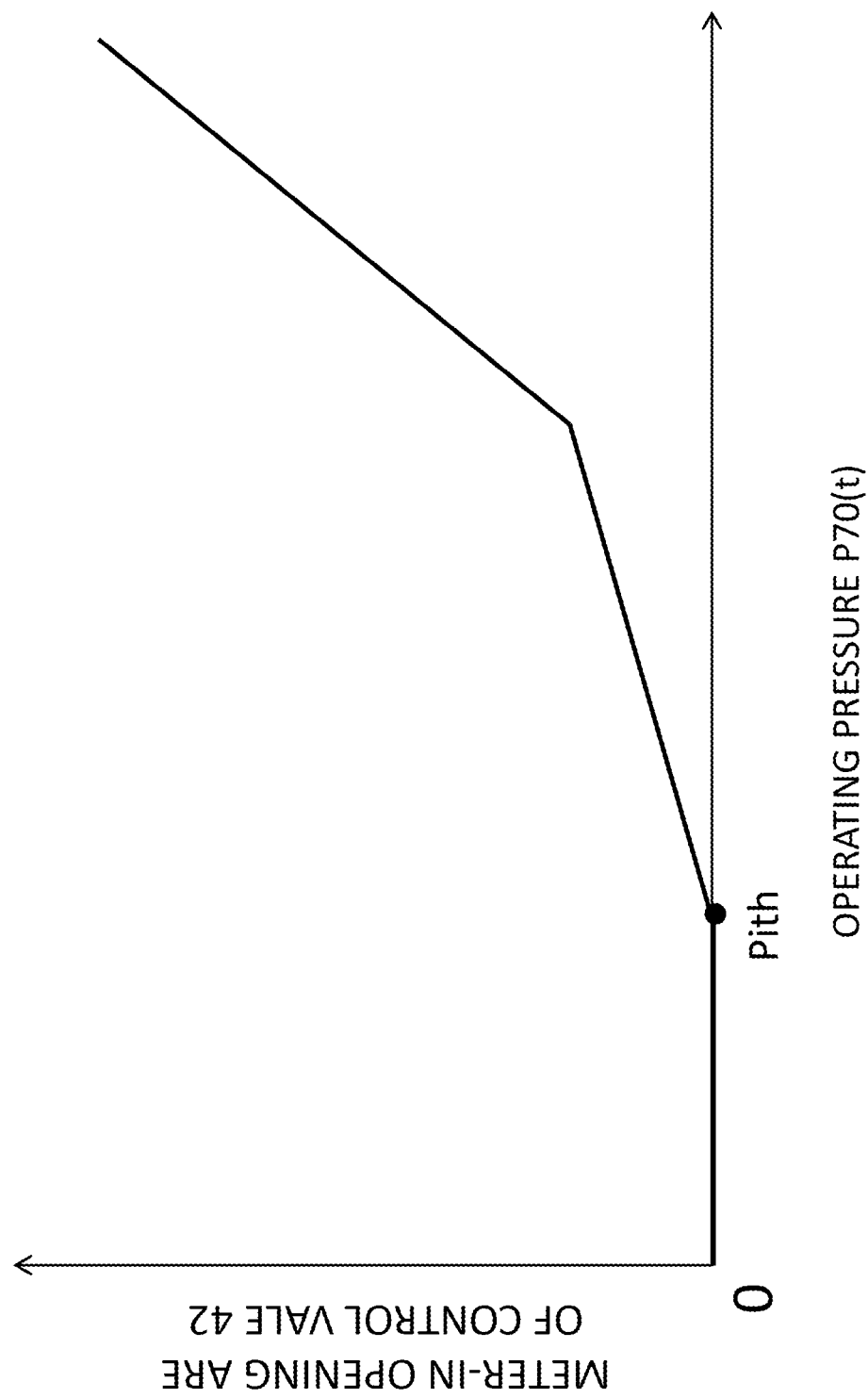
FIG. 6 is a figure illustrating a relation between an operating pressure and a meter-in opening area of a directional control valve, and is a figure for explaining the definition of an operating pressure threshold.

The definition of the threshold Pith of the operating pressure $P70(t)$ is explained by using FIG. 6.

FIG. 6 is a figure illustrating a relation between the operating pressure $P70(t)$ and the meter-in opening area of the directional control valve 42.

In FIG. 6, Pith is a pressure value at which the meter-in opening of the directional control valve 42 starts being opened when the operation lever 44a is being operated, and the operating pressure $P70(t)$ increases. That is, since the meter-in opening of the directional control valve 42 is not opened until the operating pressure P70(*t*) reaches the value of Pith, the hydraulic motor 43 is not actuated. When the operating pressure P70(*t*) becomes higher than Pith, the meter-in opening of the directional control valve 42 is opened, and the hydraulic motor 43 is actuated. The operation state deciding section 50*c*-1 sets the threshold to the pressure value Pith of the operating pressure at which the meter-in opening starts being opened.

Figure 7:
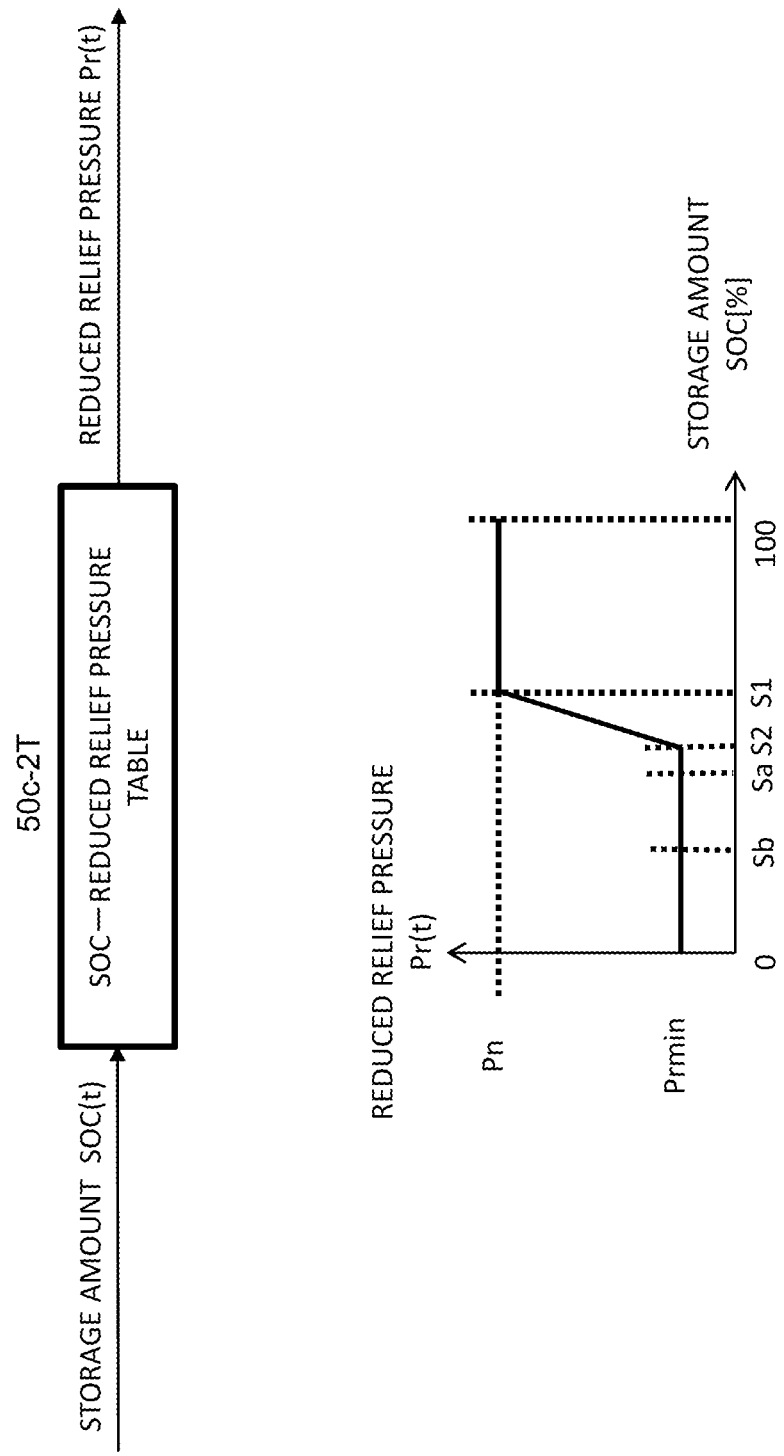
FIG. 7 is a figure illustrating a calculation flow of a reduced relief pressure calculating section illustrated in FIG. 4.

FIG. 7 is a figure illustrating a calculation flow of the reduced relief pressure calculating section 50*c*-2 illustrated in FIG. 4, and the calculation flow is executed repeatedly for each sampling time Δt while the controller 50 is being operated.

In FIG. 7, the storage amount SOC(t) is input to an SOC—reduced relief pressure table 50*c*-2T, and the reduced relief pressure Pr(t) corresponding to the storage amount SOC(t) at that time is calculated. As illustrated in the lower half of FIG. 7, a relation between the storage amount SOC(t) and the reduced relief pressure Pr(t) is set in the SOC—reduced relief pressure table 50*c*-2T such that: the reduced relief pressure Pr(t) is a normal relief pressure Pn when the storage amount SOC(t) is equal to or larger than S1; the reduced relief pressure Pr(t) lowers from the normal relief pressure Pn to a minimum relief pressure Prmin when the storage amount SOC(t) decreases from S1 to S2; and the reduced relief pressure Pr(t) is kept at the minimum relief pressure Prmin when the storage amount SOC(t) decreases to an amount equal to or smaller than S2.

Here, S1 is a preset threshold for the storage amount SOC(t) for deciding whether it is necessary to lower the normal relief pressure set by the spring 3*a* of the relief valve 3 and protect the battery 62 to prevent the battery 62 from deteriorating when the storage amount SOC(t) of the battery 62, which is an electric power source, has decreased.

The reduced relief pressure calculating section 50*c*-2 calculates, by using such an SOC—reduced relief pressure table 50*c*-2T, the reduced relief pressure Pr(t) according to the storage amount SOC(t), and transmits the calculated reduced relief pressure Pr(t) to the target relief pressure calculating section 50*c*-4.

Figure 8:
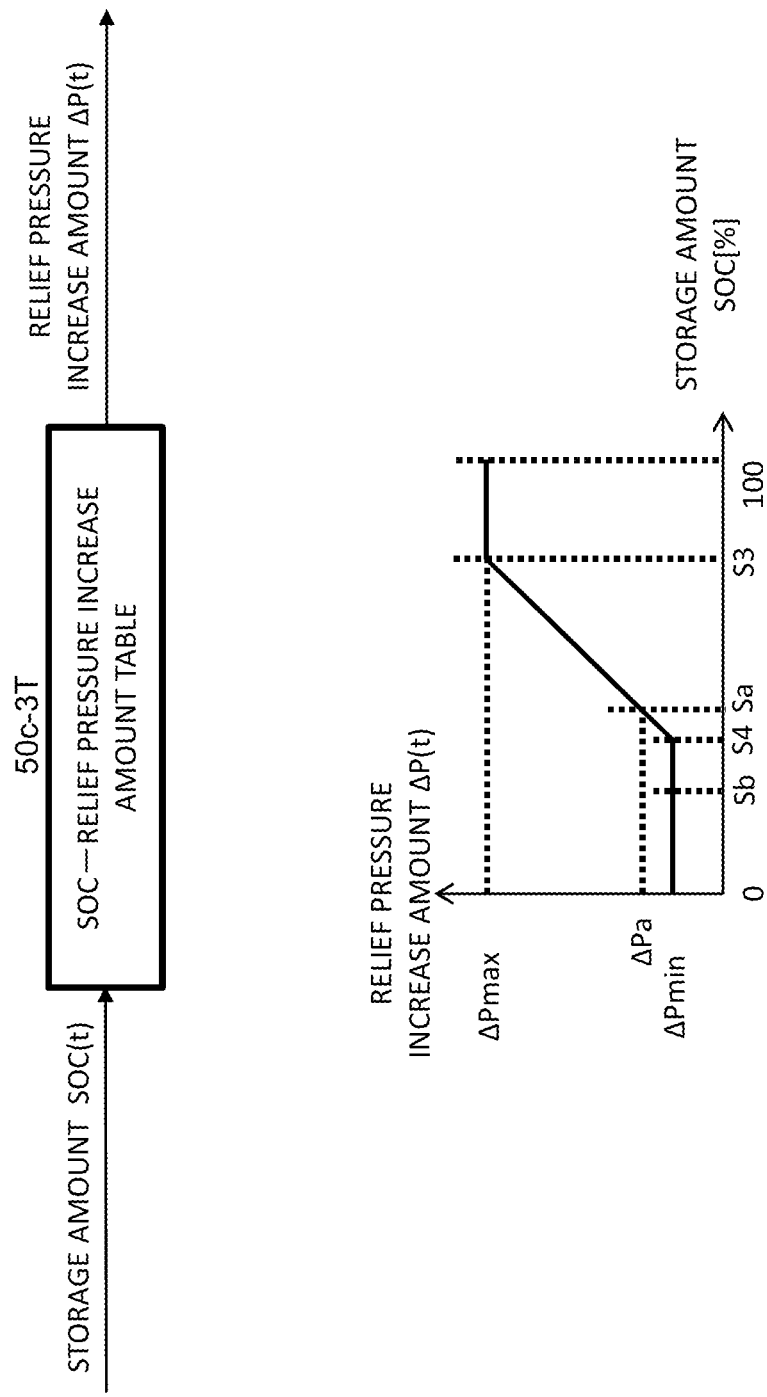
FIG. 8 is a figure illustrating a calculation flow of a relief pressure increase amount calculating section illustrated in FIG. 4.

FIG. 8 is a figure illustrating a calculation flow of the relief pressure increase amount calculating section 50*c*-3 illustrated in FIG. 4, and the calculation flow is executed repeatedly for each sampling time Δt while the controller 50 is being operated.

In FIG. 8, the storage amount SOC(t) is input to an SOC—relief pressure increase amount table 50*c*-3T, and the relief pressure increase amount ΔP(t) corresponding to the storage amount SOC(t) at that time is calculated. As illustrated in the lower half of FIG. 8, a relation between the storage amount SOC(t) and the relief pressure increase amount ΔP(t) is set in the SOC—relief pressure increase amount table 50*c*-3T such that: the relief pressure increase amount ΔP(t) is a maximum ΔPmax when the storage amount SOC(t) is equal to or larger than S3; the relief pressure increase amount ΔP(t) lowers from the maximum relief pressure increase amount ΔPmax to a minimum relief pressure increase amount ΔPmin when the storage amount SOC(t) decreases from S3 to S4; and the relief pressure increase amount ΔP(t) is kept at the minimum relief pressure increase amount ΔPmin when the storage amount SOC(t) decreases to an amount equal to or smaller than S4.

The relief pressure increase amount calculating section 50*c*-3 calculates, by using such an SOC—relief pressure increase amount table 50*c*-3T, the relief pressure increase amount ΔP(t) according to the storage amount SOC(t), and transmits the calculated relief pressure increase amount ΔP(t) to the target relief pressure calculating section 50*c*-4.

Figure 9:
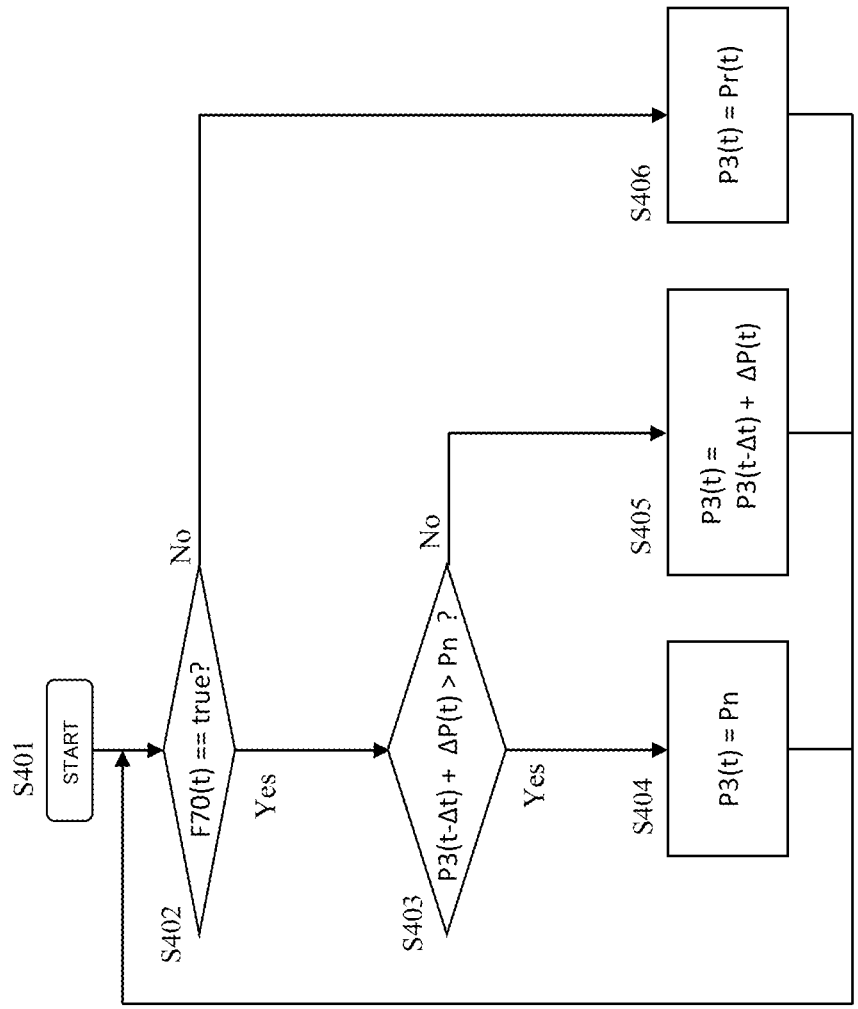
FIG. 9 is a flowchart illustrating a calculation flow of a target relief pressure calculating section illustrated in FIG. 4.

FIG. 9 is a flowchart illustrating a calculation flow of the target relief pressure calculating section 50*c*-4 illustrated in FIG. 4, and the calculation flow is executed repeatedly for each sampling time Δt while the controller 50 is being operated.

At Step S401, a computation by the target relief pressure calculating section 50*c*-4 is started.

At Step S402, the target relief pressure calculating section 50*c*-4 decides whether the operation flag F70(*t*) has been set to true (enabled). When the operation flag F70(*t*) has been set to true, the result of the decision is Yes, and the procedure proceeds to a process at Step S403. When the operation flag F70(*t*) has been set to false (disabled), the result of the decision is No, and the procedure proceeds to a process at Step S406.

At Step S403, the target relief pressure calculating section 50*c*-4 decides whether the sum of the relief pressure increase amount ΔP(t) and the target relief pressure P3(*t*–Δt) sensed one sampling time Δt before is larger than the normal relief pressure Pn. The target relief pressure P3(*t*–Δt) sensed one sampling time Δt before is the current value of the target relief pressure. When the sum of P3(*t*–Δt) and ΔP(t) is larger than the normal relief pressure Pn, the result of the decision at Step S403 is Yes, and the procedure proceeds to a process at Step S404. When the sum of P3(*t*–Δt) and ΔP(t) is equal to or smaller than the normal relief pressure Pn, the result of the decision at Step S403 is No, and the procedure proceeds to a process at Step S405.

At Step S404, the target relief pressure calculating section 50*c*-4 sets the target relief pressure P3(*t*) to the normal relief pressure Pn. Then, the target relief pressure calculating section 50*c*-4 outputs the target relief pressure P3(*t*) to the output signal converting section 50*z*.

At Step S405, the target relief pressure calculating section 50*c*-4 sets the target relief pressure P3(*t*) to the sum of the relief pressure increase amount ΔP(t) and the target relief pressure P3(*t*–Δt) sensed one sampling time before. Then, the target relief pressure calculating section 50*c*-4 outputs the target relief pressure P3(*t*) to the output signal converting section 50*z*.

At Step S406, the target relief pressure calculating section 50*c*-4 sets the target relief pressure P3(*t*) to the reduced relief pressure Pr(t). Then, the target relief pressure calculating section 50*c*-4 outputs the target relief pressure P3(*t*) to the output signal converting section 50*z*.

In this manner, in the present embodiment, the controller 50 sets the target relief pressure of the relief valve 3 to the normal relief pressure Pn (first relief pressure) when the operation lever device 44 is not being operated and the storage amount SOC(t) of the battery 62 (the state quantity of the electric power source) is equal to or larger than the threshold S1, and sets the target relief pressure to the reduced relief pressure Pr(t) (second relief pressure) lower than the normal relief pressure Pn (first relief pressure) when the operation lever device 44 is not being operated and the storage amount SOC(t) of the battery 62 (the state quantity of the electric power source) is smaller than the threshold S1.

In addition, the controller 50 makes the target relief pressure the normal relief pressure Pn (first relief pressure) by increasing the target relief pressure at a predetermined rate in a case where the operation lever device 44 is operated to start driving the hydraulic motor 43 (actuator) when the target relief pressure is the reduced relief pressure Pr(t) (second relief pressure) lower than the normal relief pressure Pn (first relief pressure).

Furthermore, the controller 50 calculates the relief pressure increase amount ΔP(t) that decreases as the storage amount SOC(t) of the battery 62 (the state quantity of the electric power source) decreases for each predetermined time (sampling time Δt) in a case where the operation lever device 44 is operated to start driving the hydraulic motor 43 (actuator) when the target relief pressure is the reduced relief pressure Pr(t) (second relief pressure) lower than the normal relief pressure Pn (first relief pressure), and makes the target relief pressure the normal relief pressure Pn (first relief pressure) by adding the relief pressure increase amount ΔP(t) to the current value of the target relief pressure, and increasing the target relief pressure at a predetermined rate.

Next, before advantages of the first embodiment are explained, a relation between output power (pump output power) of the hydraulic pump 1 and input electric power (inverter input electric power) of the inverter 61 is explained.

FIG. 10 is a figure illustrating an expression of a relation between pump output power and inverter input electric power.

VA which is a portion other than μ in the left hand side of Formula (1) in FIG. 10 is a formula for calculating electric power input to and consumed by the inverter 61. The product of a voltage V on the input terminal side of the inverter 61 and a direct current A on the input terminal side of the inverter 61 is electric power consumed by the inverter 61.

p on the left hand side of the Formula (1) in FIG. 10 is the energy conversion efficiency since energy is input to the inverter 61 until the energy is output from the hydraulic pump 1. By multiplying the electric power VA by μ, the output power of the hydraulic pump 1 is determined.

The right hand side of Formula (1) in FIG. 10 is a formula for calculating the output power of the hydraulic pump 1. By multiplying a delivery pressure (pump delivery pressure) P of the hydraulic pump 1 and a delivery flow rate (pump flow rate) Q of the hydraulic pump 1, the output power of the hydraulic pump 1 is determined.

Here, when a load acts on the hydraulic pump 1, the electric motor 60 receives load torque from the hydraulic pump 1 and the rotation speed changes, but it is supposed in the present embodiment that the magnitude of the change is sufficiently small as compared with the target rotation speed. In this case, the pump flow rate Q does not change almost at all. In addition, it is supposed that the voltage V on the input terminal side of the inverter 61 also does not change almost at all. Furthermore, it is supposed that the energy conversion efficiency p does not change significantly.

On the basis of the premises above and Formula (1) in FIG. 10, the direct current A on the input terminal side of the inverter 61 is proportional to the pump delivery pressure P. Accordingly, it can be known that a change in the direct current A on the input terminal side of the inverter 61 can be reduced by reducing a change in the pump delivery pressure P.

Next, advantages of the first embodiment are explained by using a transition example of a pump delivery pressure and pump output power.

Figure 11:
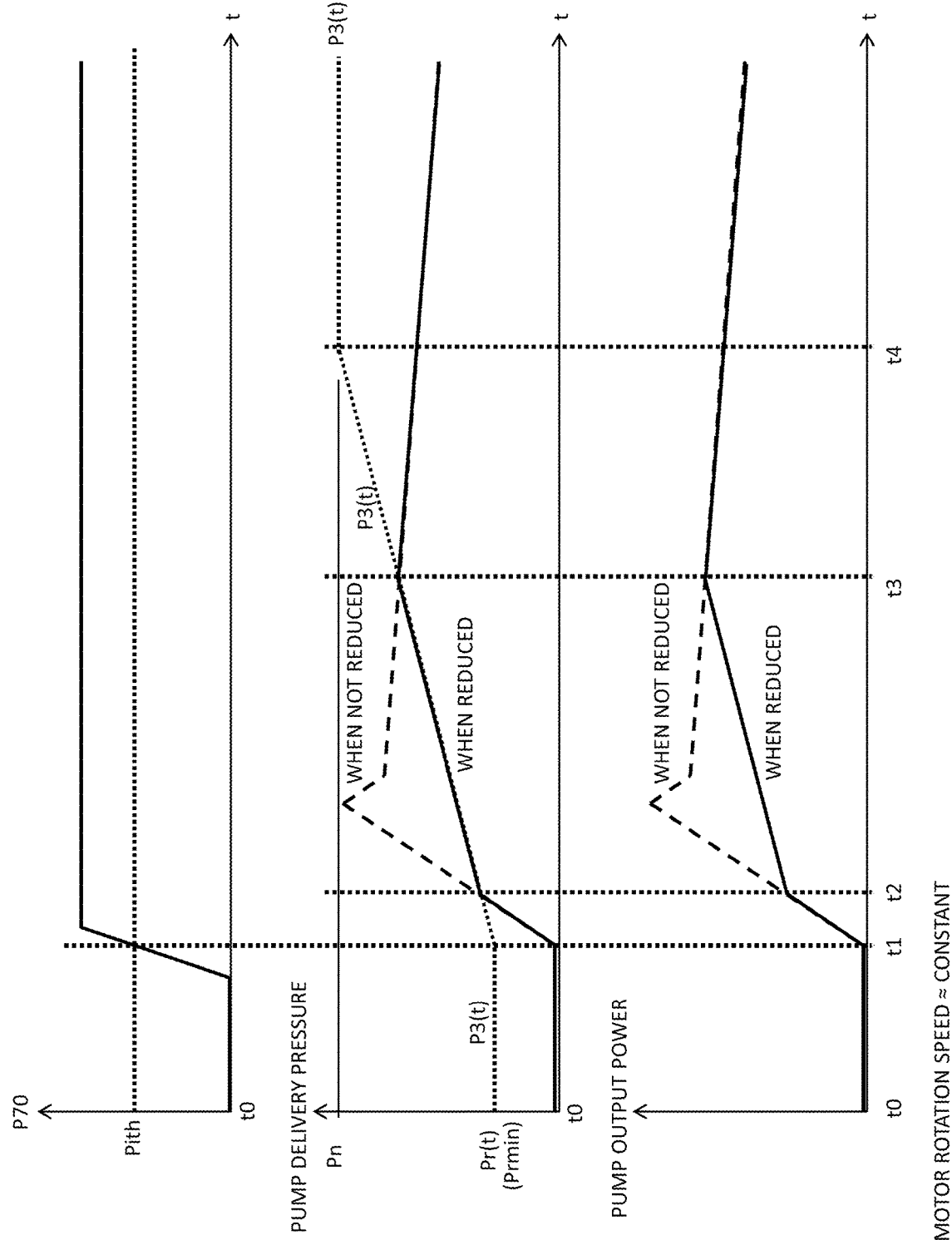
FIG. 11 is a figure illustrating a transition example of a pump delivery pressure and pump output power in the first embodiment.

FIG. 11 is a figure illustrating a transition example of a pump delivery pressure and pump output power in the first embodiment. In FIG. 11, the top graph illustrates temporal changes in the operating pressure P70(t), the middle graph illustrates temporal changes in the pump delivery pressure, and the bottom graph illustrates pump output power (the output power of the hydraulic pump 1).

In the transition example illustrated in FIG. 11, the storage amount SOC(t) of the battery 62 is Sa, which is smaller than the threshold S1 in the tables illustrated in FIG. 7 and FIG. 8. At this time, the target relief pressure P3(t) is reduced to a pressure lower than the normal relief pressure Pn, the reduced relief pressure Pr(t) calculated in accordance with the SOC—reduced relief pressure table 50c-2T illustrated in FIG. 7 is the minimum relief pressure Prmin, and the relief pressure increase amount ΔP(t) calculated in accordance with the SOC—relief pressure increase amount table 50c-3T illustrated in FIG. 8 is a value ΔPa between the maximum relief pressure increase amount ΔPmax and the minimum relief pressure increase amount ΔPmin. In addition, in a state in which the operation lever 44a is not being operated, at Step S406 in FIG. 9, the target relief pressure calculating section 50c-4 calculates the target relief pressure P3(t) which is the reduced relief pressure Pr(t) equal to the minimum relief pressure Prmin.

In FIG. 11, at time t0, the operation lever 44a is not being operated, and the operating pressure P70(t) is lower than the threshold Pith. In addition, at Step S406 in FIG. 9, the target relief pressure P3(t) which is the reduced relief pressure Pr(t) equal to the minimum relief pressure Prmin is calculated, and the target relief pressure P3(t) has been set to the minimum relief pressure Prmin.

It is supposed that the operation lever 44a is operated thereafter, and, at time t1, the operating pressure P70(t) has reached the threshold Pith. In this case, since the operating pressure P70(t) is lower than the threshold Pith until time t1, the target relief pressure P3(t) is left set to the minimum relief pressure Prmin during that time.

After time t1, the operating pressure P70(t) becomes higher than the threshold Pith. Since the meter-in opening of the directional control valve 42 is opened at this time, the pump delivery pressure starts increasing according to the magnitude of the load of the hydraulic motor 43. In addition, since the result of the decision at Step S402 in FIG. 9 is Yes, and the result of the decision at Step S403 is No, the target relief pressure P3(t) is set to the sum of ΔP(t) (=ΔPa) and the target relief pressure P3(t–Δt) sensed one sampling time before, and the target relief pressure P3(t) increases from the minimum relief pressure Prmin at an inclination (rate of change) equal to ΔPa/Δt. The calculations at Steps S402 and S403 are repeated while the operating pressure P70(t) is higher than the threshold Pith until the operating pressure P70(t) reaches the normal relief pressure Pn at time t4. Thereafter, the target relief pressure P3(t) is set to the normal relief pressure Pn at the process at Step S404.

At time t2, the pump delivery pressure that increases according to the magnitude of the load of the hydraulic motor 43 matches a target relief pressure P3(t2) at that time point. At this time, whereas the pump delivery pressure changes (increases) significantly as represented by a dotted line when the control of the present invention is not being performed, the relief valve 3 is opened at this time point to discharge the hydraulic fluid to the tank, and the pump delivery pressure increases while not being allowed to become higher than the target relief pressure P3(t) when the control of the present invention is being performed; as a result, a rapidly change (increase) in the pump delivery pressure can be reduced as represented by the solid line.

At a time point between time t2 and time t3, the load of the hydraulic motor 43 starts decreasing, and the pump delivery pressure and a target relief pressure P3(t3) match at time t3. Since the pump delivery pressure thereafter is lower than the target relief pressure P3($t$), the pump delivery pressure changes without being restricted to the target relief pressure P3($t$).

As mentioned above, even in a case where the pump delivery pressure almost starts increasing rapidly immediately after operation is started, the magnitude of the change in the pump delivery pressure is reduced because the target relief pressure P3($t$) is reduced due to the control of the present invention. As a result, as illustrated in the bottom section in FIG. 11, the pump output power also is reduced, and a change in the direct current consumed by the inverter 61 also is reduced. In addition, since the relief pressure increases at a predetermined temporal rate after operation is started, eventually the pressure necessary for operating the hydraulic excavator can be obtained.

Next, advantages attained by making the set relief pressure increase amount variable according to the storage amount SOC(t) are explained.

Figure 12:
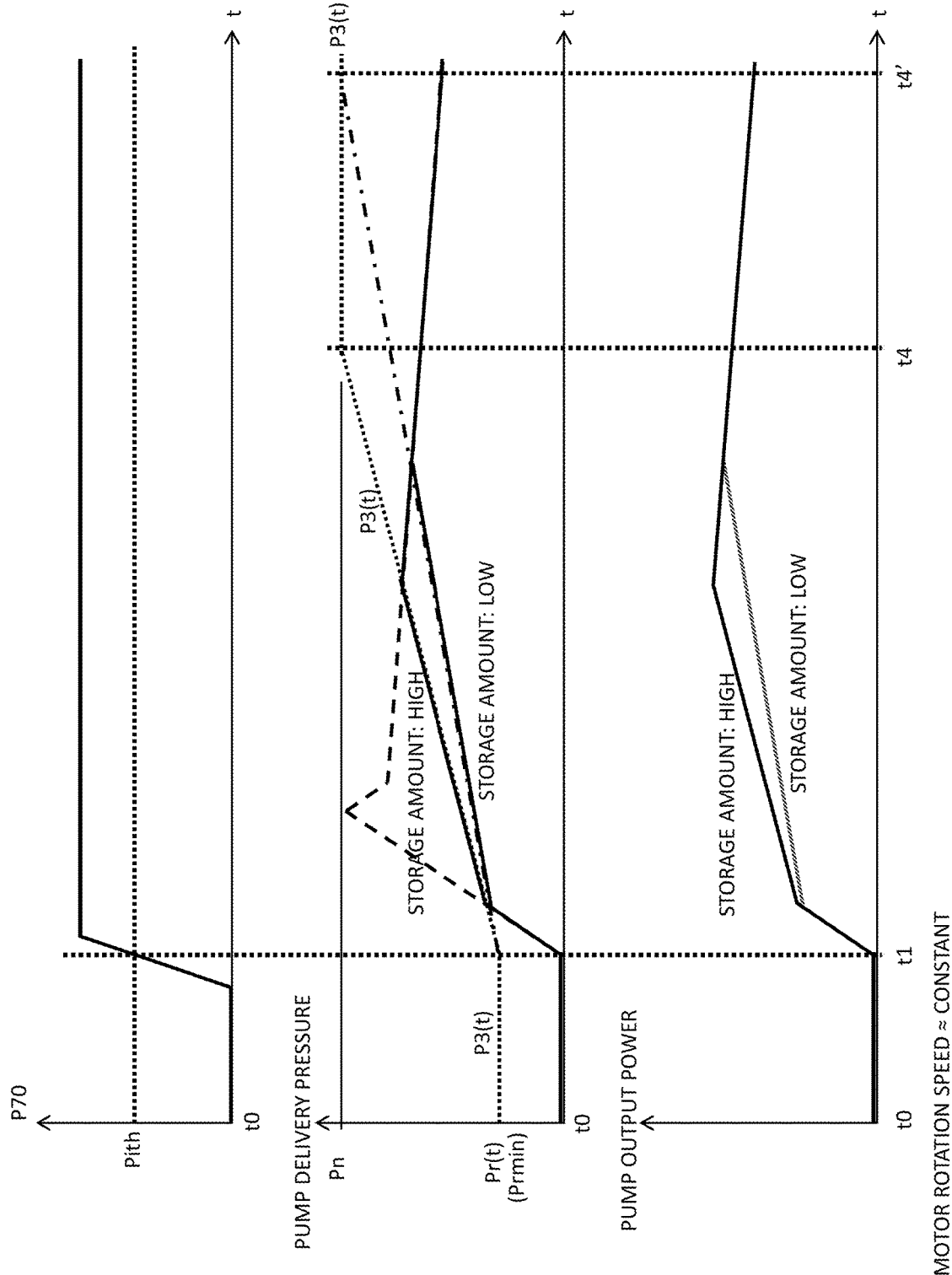
FIG. 12 is a figure illustrating a transition example of a pump delivery pressure and pump output power when a relief pressure increase amount calculated in accordance with an SOC—relief pressure increase amount table illustrated in FIG. 8 varies according to a storage amount.

FIG. 12 is a figure illustrating a transition example of a pump delivery pressure and pump output power when the relief pressure increase amount ΔP(t) calculated in accordance with the SOC—relief pressure increase amount table 50$c$-3T illustrated in FIG. 8 varies according to the storage amount SOC(t). Note that it is supposed that the reduced relief pressure Pr(t) calculated in accordance with the SOC—reduced relief pressure table 50$c$-2T illustrated in FIG. 7 is the same minimum relief pressure Prmin as that in the transition example of FIG. 11, and temporal changes in the pump delivery pressure in a case where the control of the present invention is not being performed also are the same as those in the transition example in FIG. 11.

When the storage amount SOC(t) decreases in FIG. 8, the relief pressure increase amount ΔP(t) decreases, and, for example, when the storage amount SOC(t) lowers from Sa to Sb, the relief pressure increase amount ΔP(t) changes from ΔPa to the minimum relief pressure increase amount ΔPmin. In FIG. 12, "Storage amount: high" represents the case of the transition example in FIG. 11 (the case where the storage amount SOC(t) is Sa, and the relief pressure increase amount ΔP(t) is ΔPa), and "Storage amount: low" represents a case where the storage amount SOC(t) is Sb, and the relief pressure increase amount ΔP(t) is ΔPmin. Since the relief pressure increase amount ΔP(t) is ΔPmin and is smaller than ΔPa in the case of "Storage amount: low," the time at which the target relief pressure P3($t$) reaches the normal relief pressure Pn is time t4' which is later than time t4 in the case of "Storage amount: high." Thereby, the target relief pressure P3($t$) at the same time is lower in a case where the storage amount SOC(t) is small. As a result, a change (increase) in the pump output power due to a change (increase) in the pump delivery pressure, and consequently a change (increase) in the current can be reduced further.

<Advantages>

In the manner mentioned above, in the present embodiment, since the target relief pressure P3($t$) is set to a relief pressure lower than the normal relief pressure Pn when the operation lever device 44 is not being operated and the storage amount SOC(t) of the battery 62 is smaller than the threshold S1, an increase in the delivery pressure of the hydraulic pump 1 is reduced to a relief pressure lower than the normal relief pressure Pn and an increase in the load torque of the hydraulic pump 1 is reduced when the delivery pressure of the hydraulic pump 1 almost starts increasing rapidly immediately after operation of the operation lever device 44 is started. Since, as a result, an increase in the electric power consumption of the electric motor 60 is reduced, the battery 62 (device) can be used in an appropriate state, and deterioration of the battery 62 when the storage amount SOC(t) of the battery 62 is low is prevented.

In addition, since, after operation of the operation lever device 44 is started, the target relief pressure P3($t$) is increased at a predetermined rate (ΔP/Δt) until the target relief pressure P3($t$) reaches the normal relief pressure Pn while the operation of the operation lever device 44 is continued, eventually a delivery pressure of the hydraulic pump 1 which is necessary for operation of the hydraulic excavator can be obtained.

Furthermore, in the present embodiment, when the operation lever device 44 is operated to start driving the hydraulic motor 43 (actuator) and the target relief pressure at that time is the reduced relief pressure Pr(t) (second relief pressure) lower than the normal relief pressure Pn (first relief pressure), the relief pressure increase amount ΔP(t) that decreases as the storage amount SOC(t) of the battery 62 decreases is calculated for each sampling time Δt, and the target relief pressure P3($t$) is increased at the predetermined rate (ΔP/Δt) by adding the relief pressure increase amount ΔP(t) to the current value of the target relief pressure P3($t$). Because of this, when the storage amount SOC(t) of the battery 62 is low, the time at which the target relief pressure P3($t$) reaches the normal relief pressure Pn is time t4' which is later than the time where the storage amount SOC(t) of the battery 62 is high, and the target relief pressure P3($t$) at the same time is lower when the storage amount SOC(t) is small. As a result, an increase in the pump output power, and consequently an increase in the electric power consumption of the electric motor 60 that are caused by an increase in the pump delivery pressure are reduced according to a decreased amount of the storage amount SOC(t), the battery 62 (device) can be used in an appropriate state, and deterioration of the battery 62 can be prevented more effectively.

Note that whereas the relief pressure increase amount calculating section 50$c$-3 is provided, and it is made possible to increase the delivery pressure of the hydraulic pump 1 to the normal relief pressure Pn in the present embodiment, the relief pressure increase amount calculating section 50$c$-3 may be omitted, and the target relief pressure P3($t$) may be left at a relief pressure lower than the normal relief pressure Pn. In this case, the output power of the hydraulic pump 1 lowers a little, but it is possible to attain an advantage of preventing deterioration of the battery 62.

In addition, whereas the relief pressure increase amount calculating section 50$c$-3 is provided and the relief pressure increase amount ΔP(t) is made variable according to the storage amount SOC(t) of the battery 62 in the present embodiment, the relief pressure increase amount calculating section 50$c$-3 may not be provided, and the relief pressure increase amount ΔP(t) may be made a constant value. In this case also, the target relief pressure P3($t$) increases until the target relief pressure P3($t$) reaches the normal relief pressure Pn while operation of the operation lever device 44 is continued, and eventually a delivery pressure of the hydraulic pump 1 which is necessary for operating the hydraulic excavator can be obtained.

Modification Examples of First Embodiment

Modification Example 1

Figure 13:
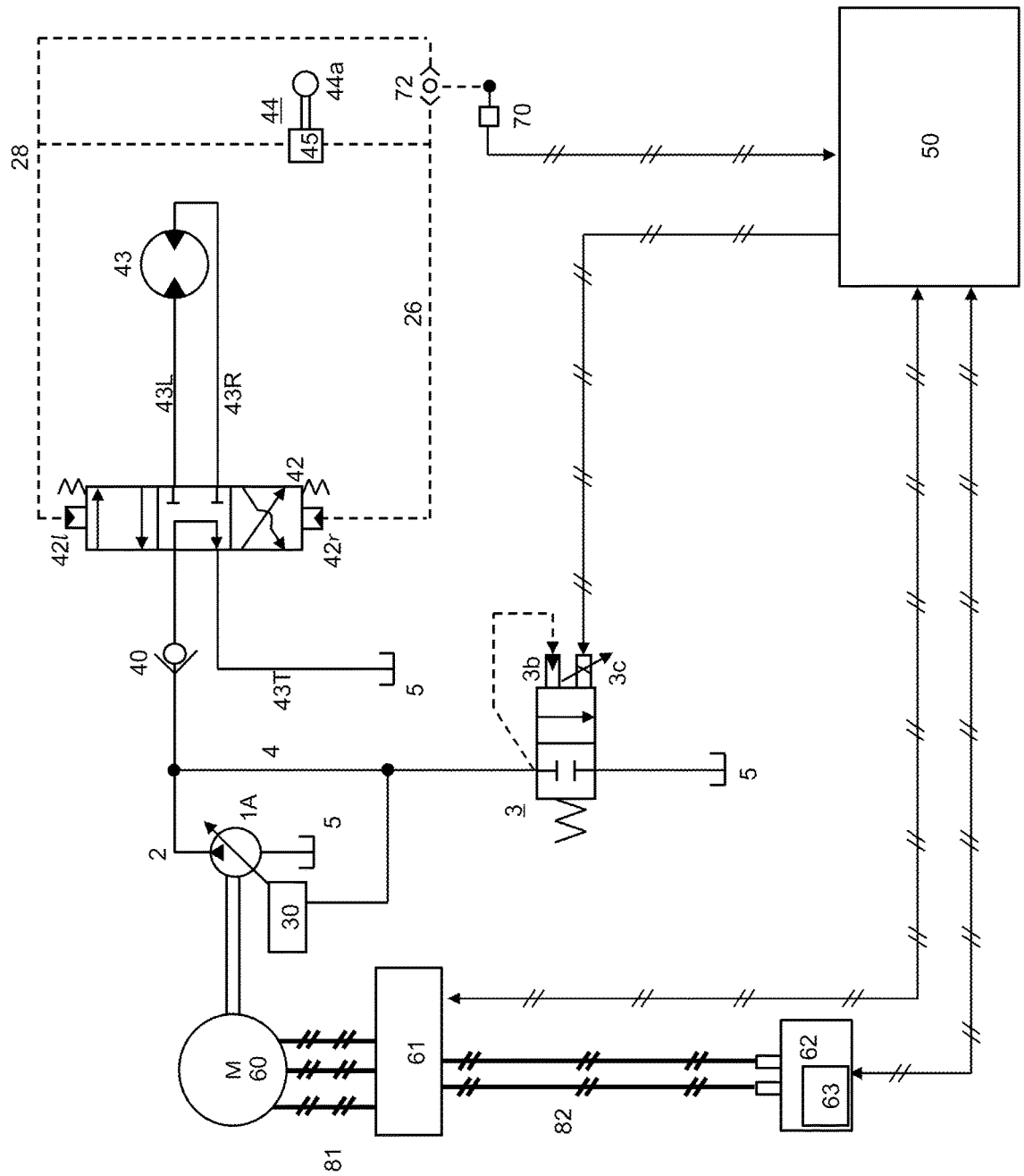
FIG. 13 is a figure illustrating the driving system according to a modification example 1 of the first embodiment.

Whereas the hydraulic pump 1 is a fixed displacement hydraulic pump in the first embodiment, the hydraulic pump may be a variable displacement hydraulic pump. FIG. 13 is a figure illustrating such a driving system. In FIG. 13, the hydraulic pump 1A is a variable displacement hydraulic pump and includes a regulator 30. In addition, the regulator 30 receives the delivery pressure of the hydraulic pump 1A as input, and performs horsepower control by controlling a delivery flow rate w of the hydraulic pump 1A by controlling the tilting angle (displacement) of the hydraulic pump 1A such that the absorption torque of the hydraulic pump 1A does not become higher than a predetermined value. Advantages similar to those in the first embodiment can be attained also when the present invention is applied to a driving system that performs such horsepower control.

Modification Example 2

Figure 14:
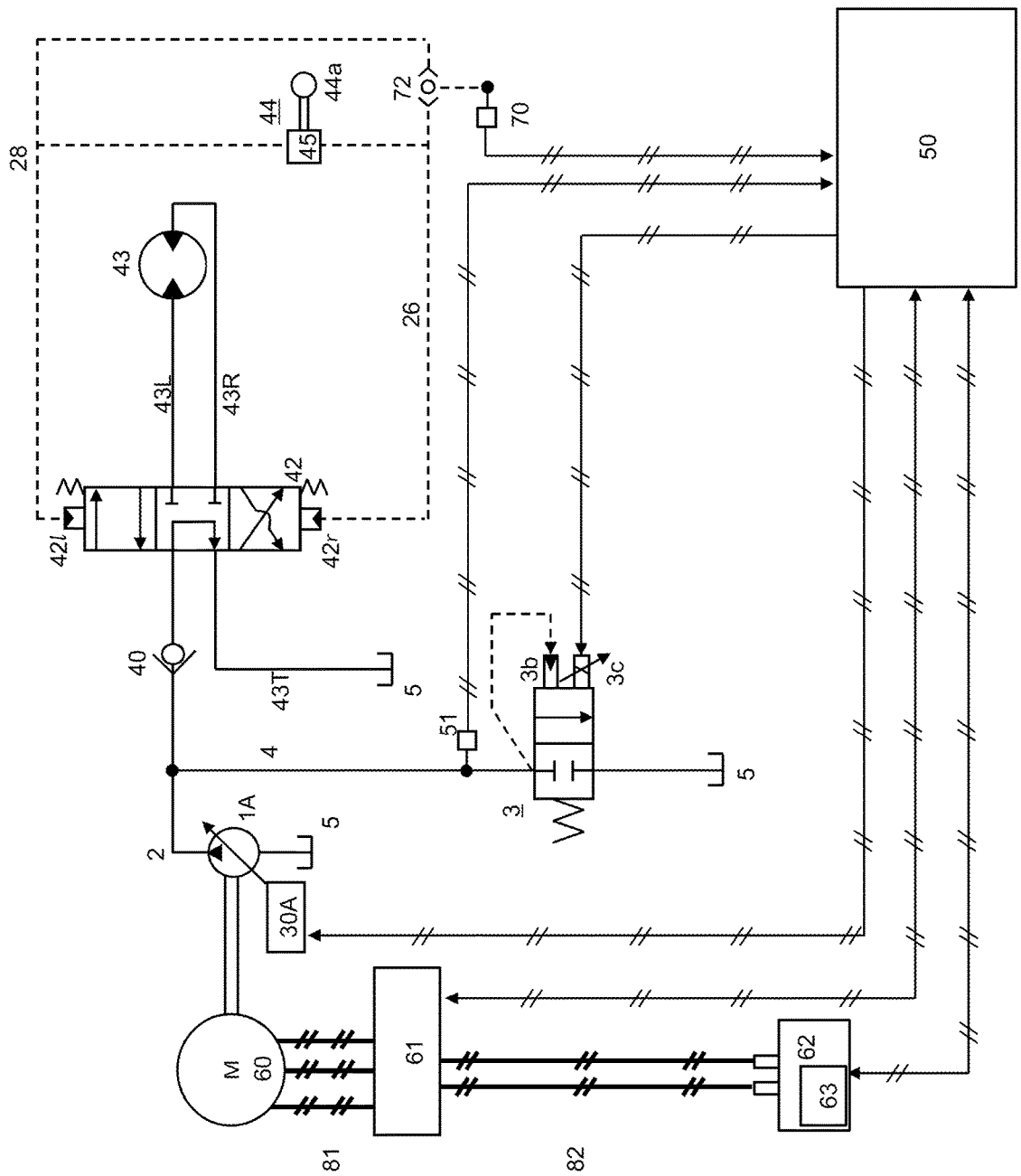
FIG. 14 is a figure illustrating the driving system according to a modification example 2 of the first embodiment.

Whereas the delivery pressure of the hydraulic pump 1A is input directly to the regulator 30 in the modification example 1, horsepower control may be performed by electrically sensing the delivery pressure of the hydraulic pump 1A, and driving a regulator on the basis of a signal of the sensing. FIG. 14 is a figure illustrating such a driving system. In FIG. 14, the driving system includes a pressure sensor 51 that electrically senses the delivery pressure of the hydraulic pump 1A, and a sensing signal (electric signal) of the pressure sensor 51 is transmitted to the controller 50. The controller 50 generates, on the basis of the electric signal, a control signal for horsepower control, and transmits the control signal to a regulator 30A. The regulator 30A receives the control signal, and controls the delivery flow rate of the hydraulic pump 1A such that the absorption torque of the hydraulic pump 1A does not becomes higher than a predetermined value. Advantages similar to those in the first embodiment can be attained also when the present invention is applied to a driving system that performs such control.

Modification Example 3

Figure 15:
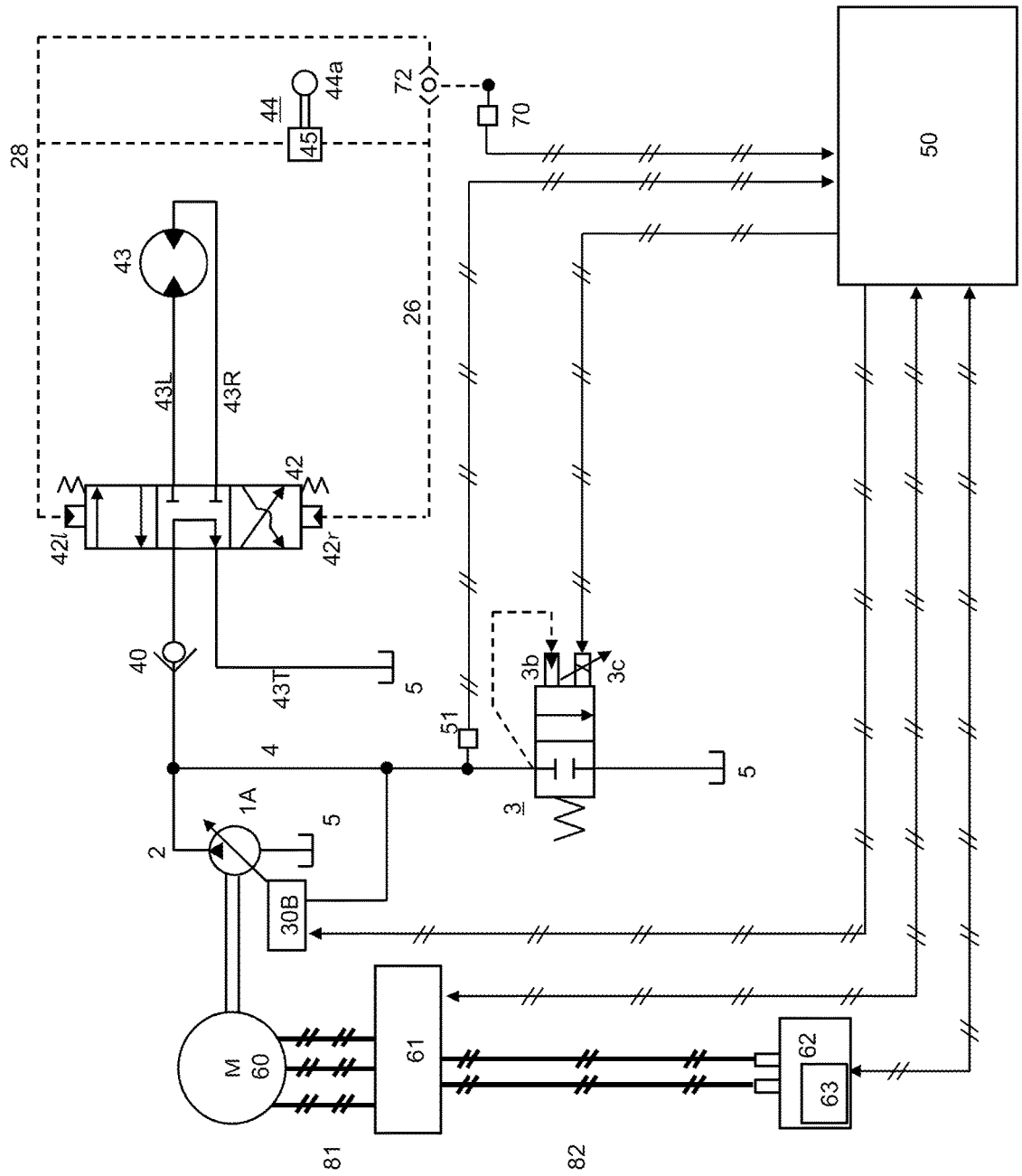
FIG. 15 is a figure illustrating the driving system according to a modification example 3 of the first embodiment.

The driving system of the present invention may have a configuration in which the delivery pressure of the hydraulic pump 1A is input directly to a regulator and the delivery pressure of the hydraulic pump 1A is sensed electrically, and a control signal is transmitted to the regulator. FIG. 15 is a figure illustrating such a driving system. In FIG. 15, a regulator 30B receives the delivery pressure of the hydraulic pump 1A as input, and performs horsepower control of the hydraulic pump 1A. In addition, the driving system includes the pressure sensor 51 that electrically senses the delivery pressure of the hydraulic pump 1A, and a sensing signal (electric signal) of the pressure sensor 51 is transmitted to the controller 50. The controller 50 generates, on the basis of the electric signal, a correction signal for horsepower control, and transmits the control signal to the regulator 30B. The correction signal for horsepower control can be a signal that corrects the maximum horsepower of the horsepower control according to an output mode of the driving system, for example. That is, for example, the driving system is configured to be capable of switching the output control mode of the motive power source (electric motor 60) to a normal mode, a power mode, and an economy mode, and, in accordance with the correction signal for horsepower control, the horsepower control start pressure is corrected and the maximum horsepower of the horsepower control is corrected depending on the output control mode. Advantages similar to those in the first embodiment can be attained also when the present invention is applied to a driving system that performs such horsepower control.

Modification Example 4

Figure 16:
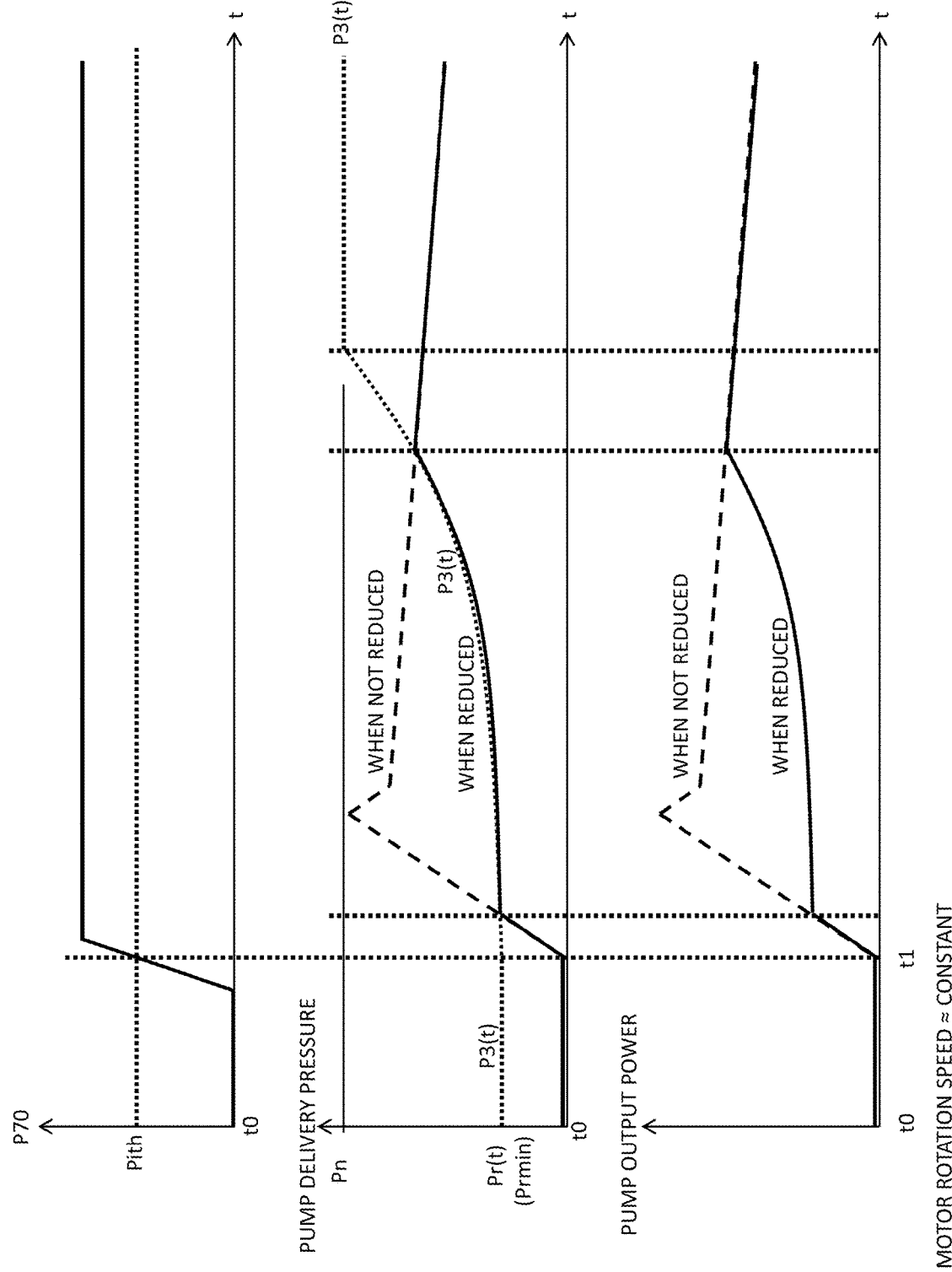
FIG. 16 is a figure illustrating a transition example of a pump delivery pressure and pump output power similar to FIG. 11 according to a modification example 4 of the first embodiment.

In the first embodiment, at Step S405 in FIG. 9, the target relief pressure P3($t$) is set by adding the constant relief pressure increase amount ΔP(t) to the target relief pressure P3($t-\Delta t$) sensed one sampling time before. However, the relief pressure increase amount ΔP(t) may be a variable value that increases over time. FIG. 16 is a figure illustrating a transition example of a pump delivery pressure and pump output power similar to the transition example in FIG. 11 in a case where such a relief pressure increase amount ΔP(t) is used. As illustrated in FIG. 16, by making the relief pressure increase amount ΔP(t) a variable value that increases over time, the increase amount of the target relief pressure P3($t$) increases over time. Thereby, it becomes possible to further reduce an increase in the pump delivery pressure to prevent deterioration of the battery 62 immediately after time t1 when an operation lever 44$a$ is operated and the operating pressure P70($t$) is higher than the threshold Pith, and to increase the target relief pressure P3($t$) promptly thereafter, and ensure that a necessary pump output power is produced without delay.

Second Embodiment

A second embodiment of the present invention is explained by using FIG. 17 to FIG. 21. Note that explanations about portions that are similar to their counterparts in the first embodiment are omitted.

Figure 17:
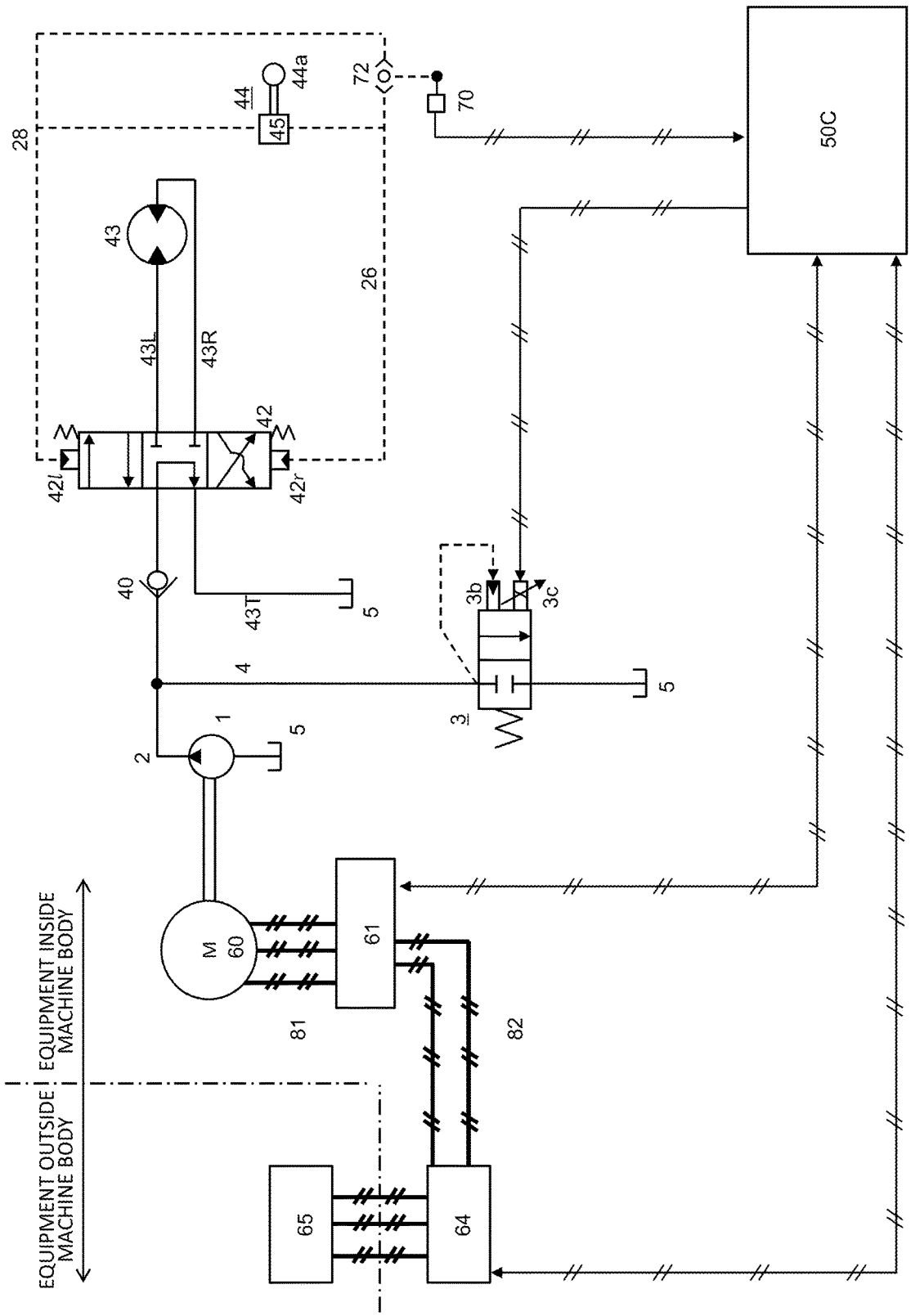
FIG. 17 is a figure illustrating the driving system according to a second embodiment of the present invention.

FIG. 17 is a figure illustrating the driving system according to the second embodiment. In FIG. 17, the driving system of the second embodiment is different from the first embodiment in that an AC/DC converter 64, which is an external electric power converting apparatus, is included as the electric power source instead of the battery 62 and the battery control controller 63, and the output side terminal of the AC/DC converter 64 is connected to the input side terminal of the inverter 61 via the electric cable 82. The AC/DC converter 64 can be connected to an external power source 65 installed outside the machine body, converts an alternating current supplied from the external power source 65 into a direct current, and outputs the direct current to the inverter 61 via the electric cable 82. In addition, the AC/DC converter 64 is electrically connected also with a controller 50C, and transmits and receives information to and from the controller 50C through communication. An available electric power supply which is the amount of power that can be output to the inverter 61 is transmitted from the AC/DC converter 64 to the controller 50C. Note that information other than the information described above may be transmitted and received between the AC/DC converter 64 and the controller 50C.

Figure 18:
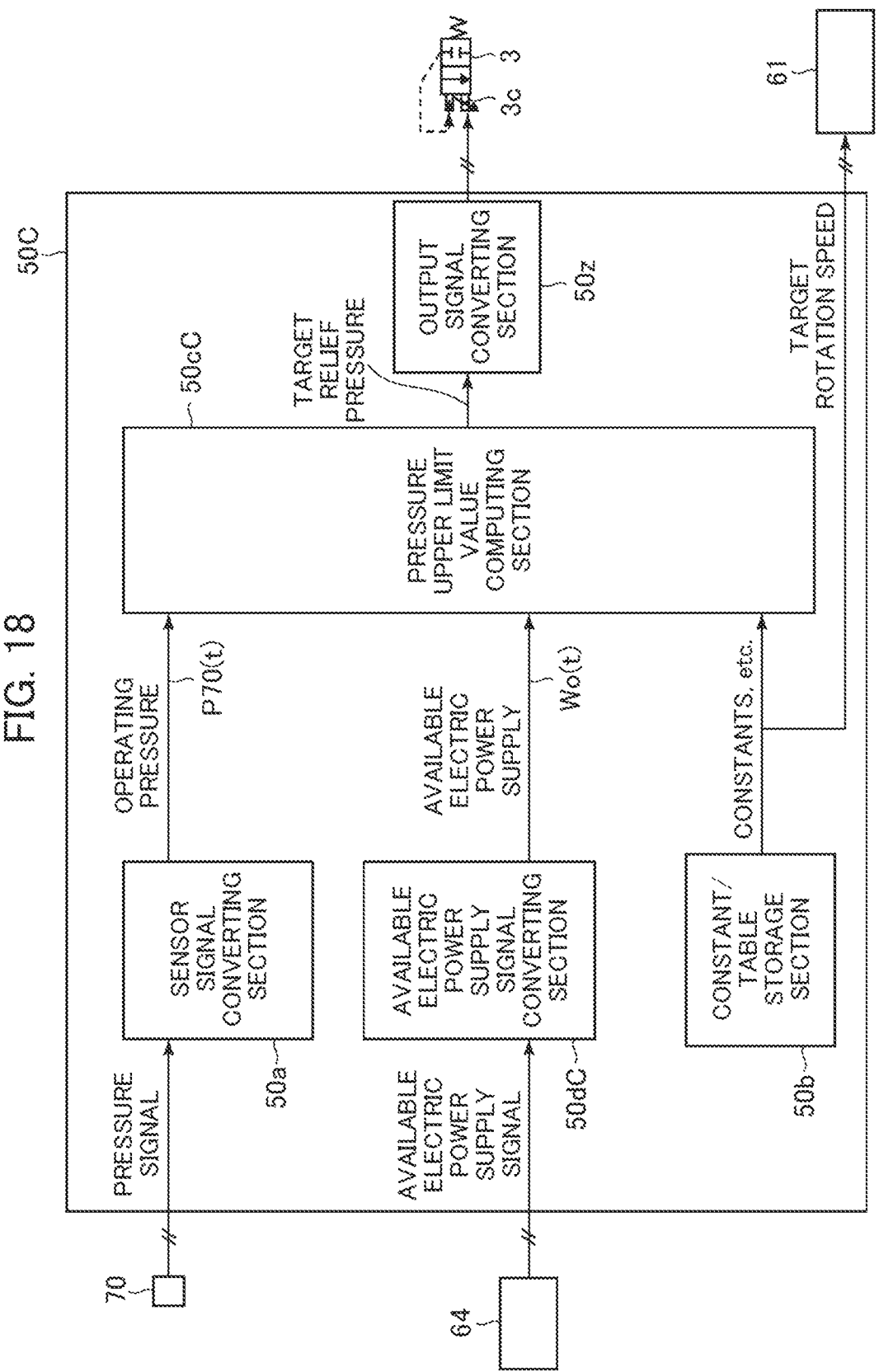
FIG. 18 is a block diagram illustrating functionalities of a controller in the second embodiment.

FIG. 18 is a block diagram illustrating functionalities of the controller 50C in the second embodiment.

In FIG. 18, the functionalities of the controller 50C in the second embodiment are different from the first embodiment in that: an available electric power supply signal converting section 50$d$C is included instead of the storage amount signal converting section 50$d$, and the available electric power supply signal converting section 50$d$C calculates an available electric power supply Wo(t) on the basis of an available electric power supply signal transmitted from the AC/DC converter 64; and a pressure upper limit value computing section 50$c$C is included instead of the pressure upper limit value computing section 50$c$, and the pressure upper limit value computing section 50$c$C receives the available electric power supply Wo(t) transmitted from the available electric power supply signal converting section 50$d$C, and computes a target relief pressure.

Figure 19:
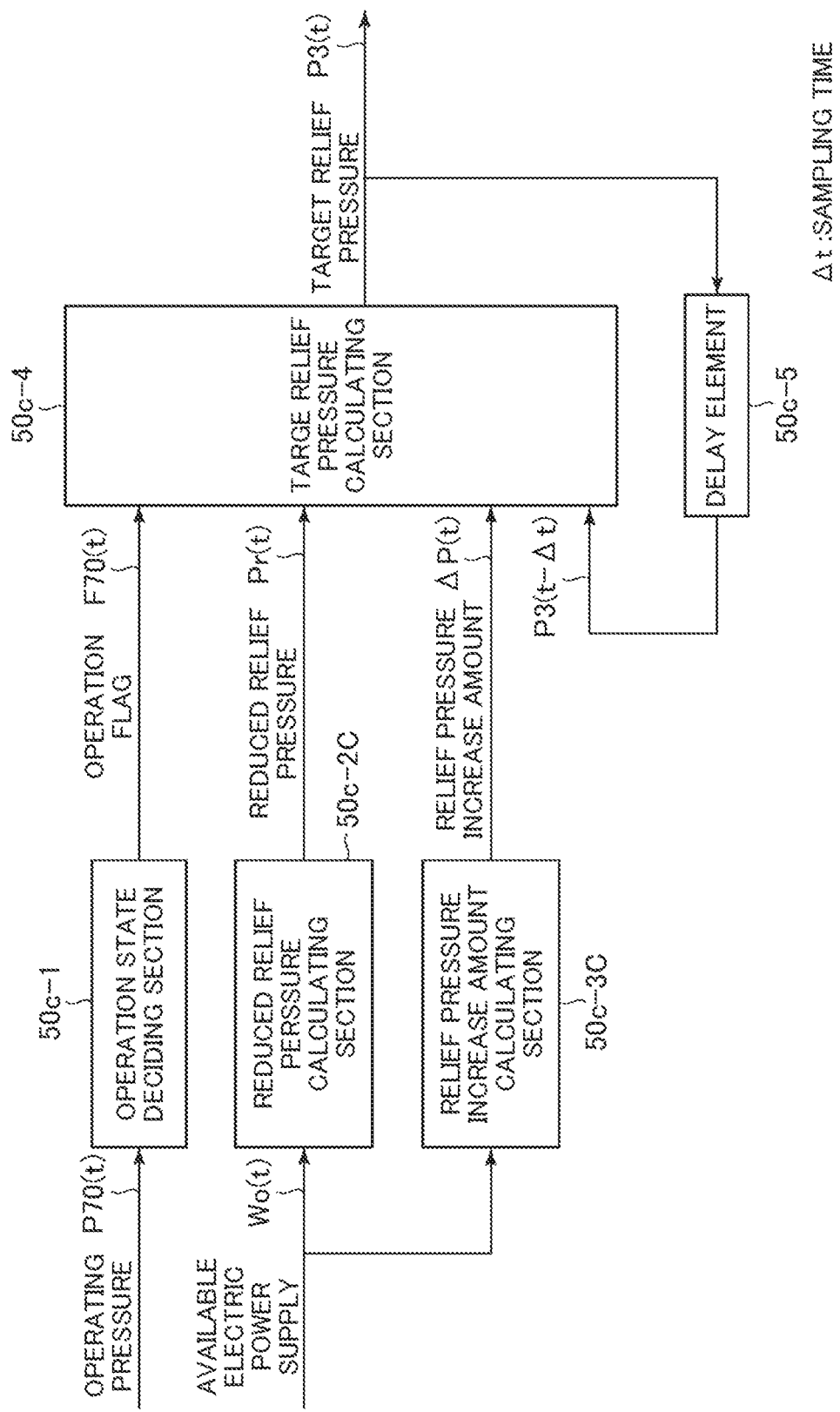
FIG. 19 is a block diagram illustrating functionalities of a pressure upper limit value computing section in the second embodiment.

FIG. 19 is a block diagram illustrating functionalities of the pressure upper limit value computing section 50cC in the second embodiment.

In FIG. 19, the functionalities of the pressure upper limit value computing section 50cC in the second embodiment are different from the first embodiment in that: a reduced relief pressure calculating section 50c-2C is included instead of the reduced relief pressure calculating section 50c-2, and the reduced relief pressure calculating section 50c-2C calculates the reduced relief pressure Pr(t) from the available electric power supply Wo(t); and a relief pressure increase amount calculating section 50c-3C is included instead of the relief pressure increase amount calculating section 50c-3, and the relief pressure increase amount calculating section 50c-3C calculates the relief pressure increase amount ΔP(t) from the available electric power supply Wo(t).

Figure 20:
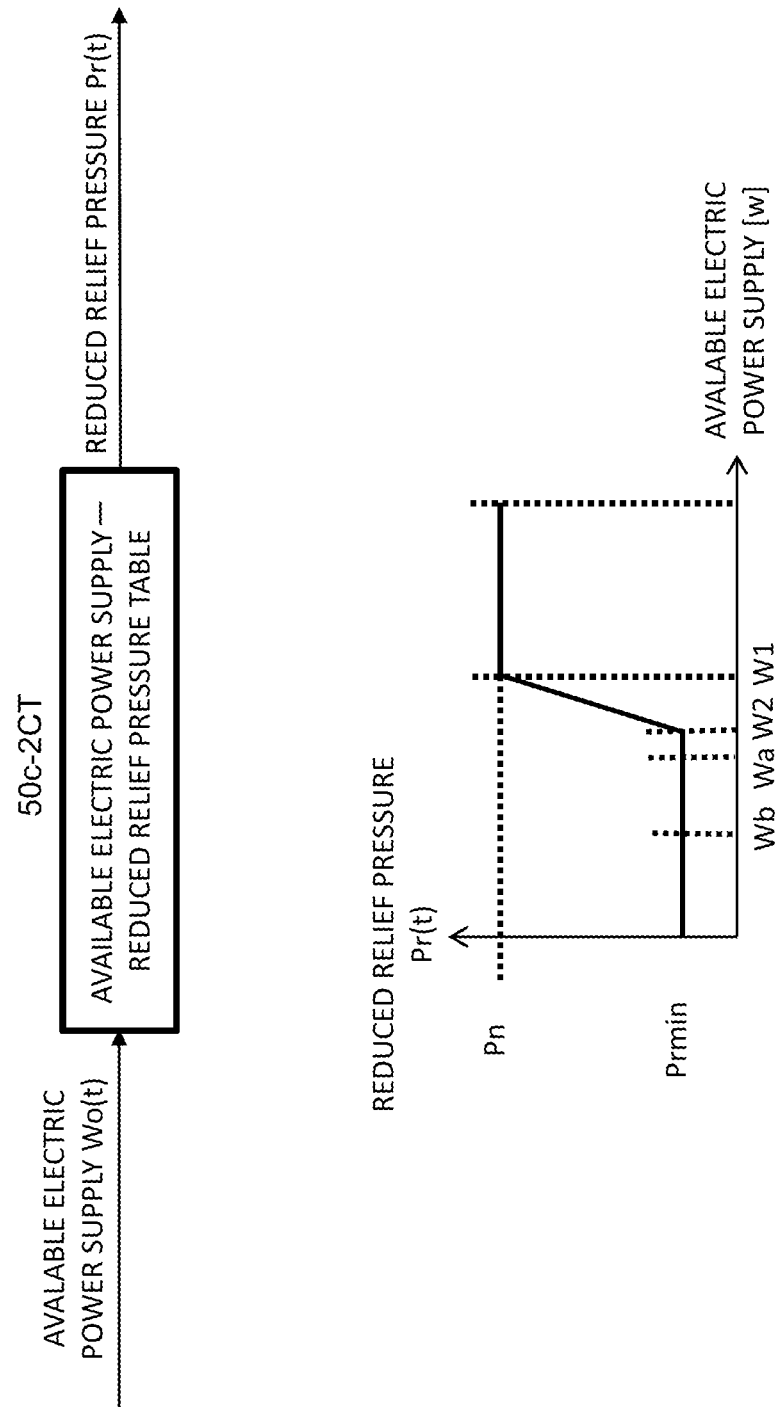
FIG. 20 is a figure illustrating a calculation flow of a reduced relief pressure calculating section in the second embodiment.

FIG. 20 is a figure illustrating a calculation flow of the reduced relief pressure calculating section 50c-2C in the second embodiment.

In FIG. 20, the calculation flow of the reduced relief pressure calculating section 50c-2C in the second embodiment is different from the first embodiment in that the available electric power supply Wo(t) is input to an available electric power supply—reduced relief pressure table 50c-2CT unlike the first embodiment in which the storage amount SOC(t) is input to the SOC—reduced relief pressure table 50c-2T. As illustrated in the lower half of FIG. 20, a relation between the available electric power supply Wo(t) and the reduced relief pressure Pr(t) is set in the available electric power supply—reduced relief pressure table 50c-2CT such that: the reduced relief pressure Pr(t) is the normal relief pressure Pn when the available electric power supply Wo(t) is equal to or larger than W1; the reduced relief pressure Pr(t) lowers from the normal relief pressure Pn to the minimum relief pressure Prmin when the available electric power supply Wo(t) decreases from W1 to W2; and the reduced relief pressure Pr(t) is kept at the minimum relief pressure Prmin when the available electric power supply Wo(t) decreases to an amount equal to or smaller than W2.

Here, similar to S1 in the first embodiment mentioned before, W1 is a preset threshold for the available electric power supply Wo(t) for deciding whether it is necessary to lower the normal relief pressure set by the spring 3a of the relief valve 3, and protect the AC/DC converter 64 (external electric power converting apparatus), which is the electric power source, such that the AC/DC converter 64 can be actuated appropriately when the available electric power supply Wo(t) of the AC/DC converter 64 decreases.

The reduced relief pressure calculating section 50c-2C calculates, by using such an available electric power supply—reduced relief pressure table 50c-2CT, the reduced relief pressure Pr(t) according to the available electric power supply Wo(t), and transmits the calculated reduced relief pressure Pr(t) to the target relief pressure calculating section 50c-4.

Figure 21:
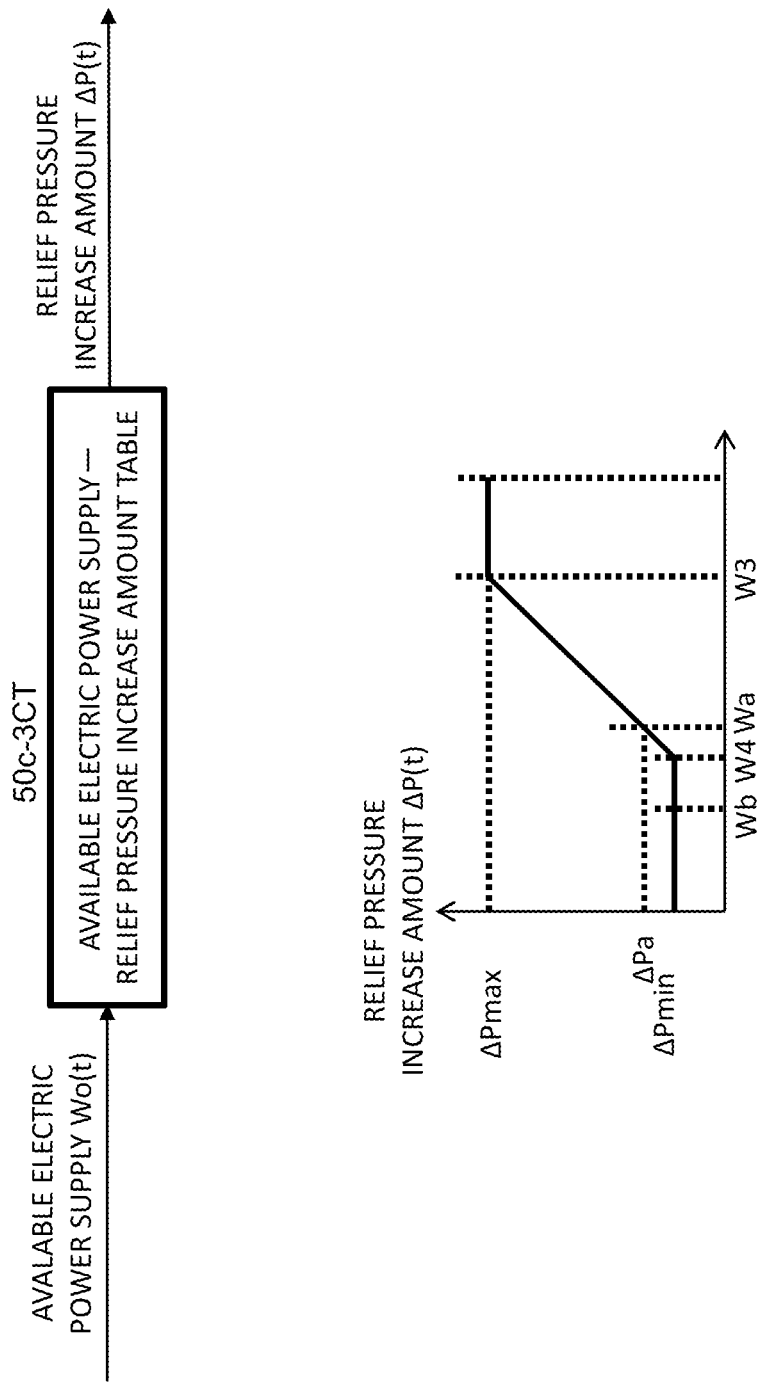
FIG. 21 is a figure illustrating a calculation flow of a relief pressure increase amount calculating section in the second embodiment.

FIG. 21 is a figure illustrating a calculation flow of the relief pressure increase amount calculating section 50c-3C in the second embodiment.

In FIG. 21, the calculation flow of the relief pressure increase amount calculating section 50c-3C in the second embodiment is different from the first embodiment in that the available electric power supply Wo(t) is input to an available electric power supply—relief pressure increase amount table 50c-3CT unlike the first embodiment in which the storage amount SOC(t) is input to the SOC—relief pressure increase amount table.

In the available electric power supply—relief pressure increase amount table 50c-3CT, as illustrated in the lower half of FIG. 21, a relation between the available electric power supply Wo(t) and the relief pressure increase amount ΔP(t) is set such that: the relief pressure increase amount ΔP(t) is the maximum ΔPmax when the available electric power supply Wo(t) is equal to or larger than W3; the relief pressure increase amount ΔP(t) lowers from the maximum relief pressure increase amount ΔPmax to the minimum relief pressure increase amount ΔPmin when the available electric power supply Wo(t) decreases from W3 to W4; and the relief pressure increase amount ΔP(t) is kept at the minimum relief pressure increase amount ΔPmin when the available electric power supply Wo(t) decreases to an amount equal to or smaller than W4.

By using such an available electric power supply—relief pressure increase amount table 50c-3CT, the relief pressure increase amount calculating section 50c-3C calculates the relief pressure increase amount ΔP(t) according to the available electric power supply Wo(t), and transmits the calculated relief pressure increase amount ΔP(t) to the target relief pressure calculating section 50c-4.

The target relief pressure calculating section 50c-4 calculates and outputs, similar to the target relief pressure calculating section 50c-4 in the first embodiment, the target relief pressure P3(t) on the basis of the operation flag F70(t), the reduced relief pressure Pr(t) and the relief pressure increase amount ΔP(t), and the target relief pressure P3(t−Δt) which has been sensed one sampling time Δt before and is the current value of the target relief pressure P3(t).

<Advantages>

In the thus configured second embodiment, in the electrically driven hydraulic construction machine that uses, as the electric power source, the AC/DC converter 64, which is an external electric power converting apparatus, and drives the electric motor 60 by using the external power source 65 installed outside the machine body, an increase in the delivery pressure of the hydraulic pump 1 is reduced to the relief pressure lower than the normal relief pressure Pn, an increase in the load torque of the hydraulic pump 1 is reduced, and an excessive increase in the electric power consumption of the electric motor 60 is reduced when the delivery pressure of the hydraulic pump 1 almost starts increasing rapidly immediately after operation of the operation lever device 44 is started. Thereby, it is possible to use the AC/DC converter 64 in an appropriate voltage range (appropriate state), and actuate the AC/DC converter 64 (device) appropriately.

Modification Example of Second Embodiment

Figure 22:
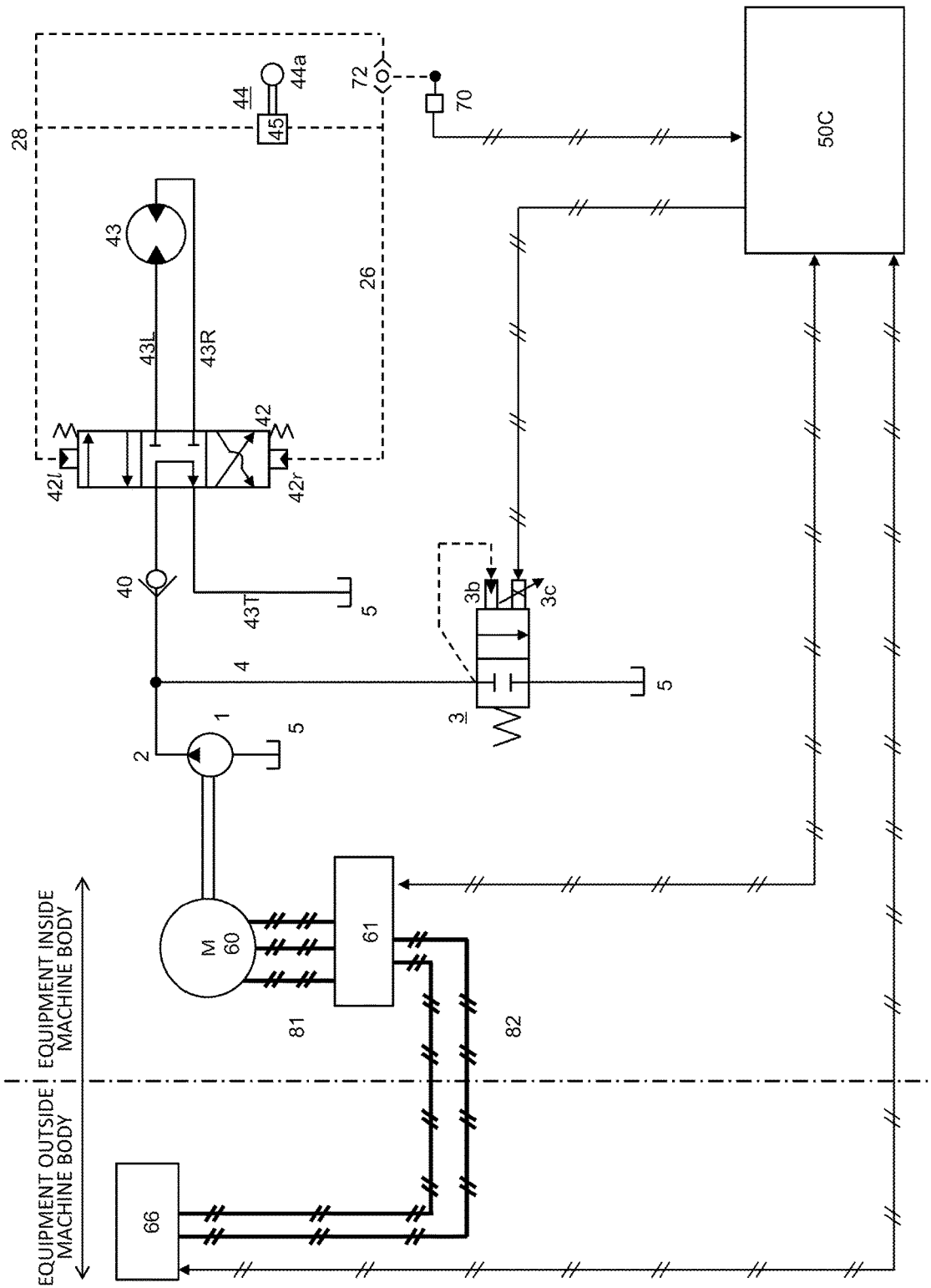
FIG. 22 is a figure illustrating the driving system which is a modification example of the second embodiment.

FIG. 22 is a figure illustrating the driving system which is a modification example of the second embodiment.

Whereas an alternating current from the external power source 65 located outside the machine body is converted into a direct current at the AC/DC converter mounted on the machine body in the second embodiment, there are no problems if an external battery 66 that is located outside the machine body and outputs a direct current is used as an external electric power supplying apparatus, the external battery 66 is connect to the inverter 61 via the electric cable 82, and the controller 50C communicates with the external battery 66 and receives information about the available electric power supply of the external battery 66 as illustrated in FIG. 22. Thereby, it is possible to use the inverter 61 in an appropriate voltage range (appropriate state), and actuate the inverter 61 (device) appropriately when the storage amount SOC(t) of the external battery 66 is low. In addition, deterioration of the external battery 66 can be prevented, and the integrity of the external battery 66 can be ensured.

Third Embodiment

A third embodiment of the present invention is explained by using FIG. 23 to FIG. 27. Note that explanations about portions that are similar to their counterparts in the first embodiment and the second embodiment are omitted.

Figure 23:
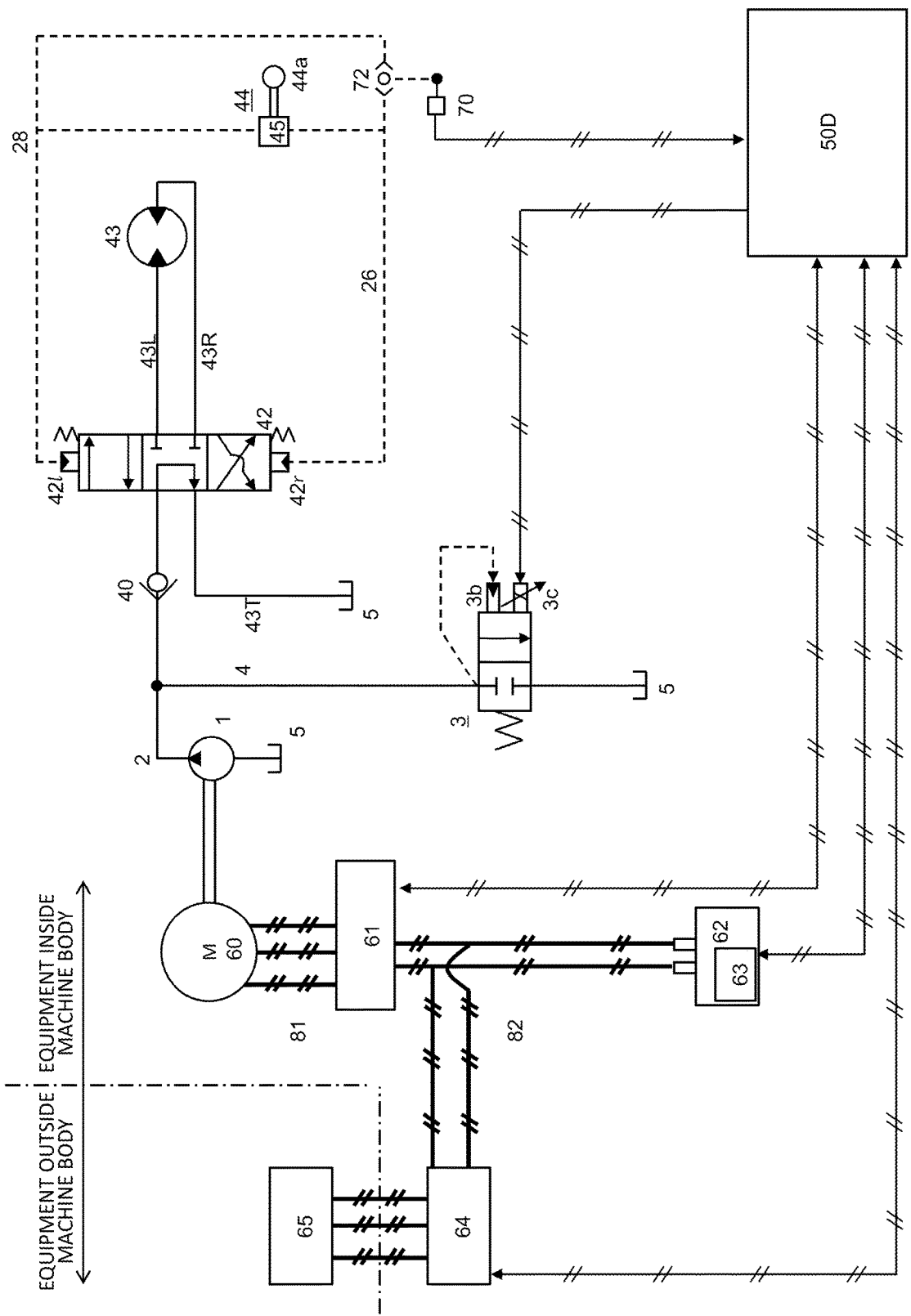
FIG. 23 is a figure illustrating the driving system according to a third embodiment of the present invention.

FIG. 23 is a figure illustrating the driving system according to the third embodiment. In FIG. 23, the third embodiment has a configuration which is a combination of the first embodiment and the second embodiment, and the battery 62 and the AC/DC converter 64 are connected to each other via the electric cable 82 such that the battery 62 and the AC/DC converter 64 are electrically parallel to the inverter 61. The battery control controller 63 is mounted on the battery 62. The AC/DC converter 64 converts an alternating current supplied from the external power source 65 located outside the machine body into a direct current, and outputs the direct current to the inverter 61 via the electric cable 82. The inverter 61 and the AC/DC converter 64 electrically connected also with a controller 50D, and transmit and receive information to and from the controller 50D through communication.

Figure 24:
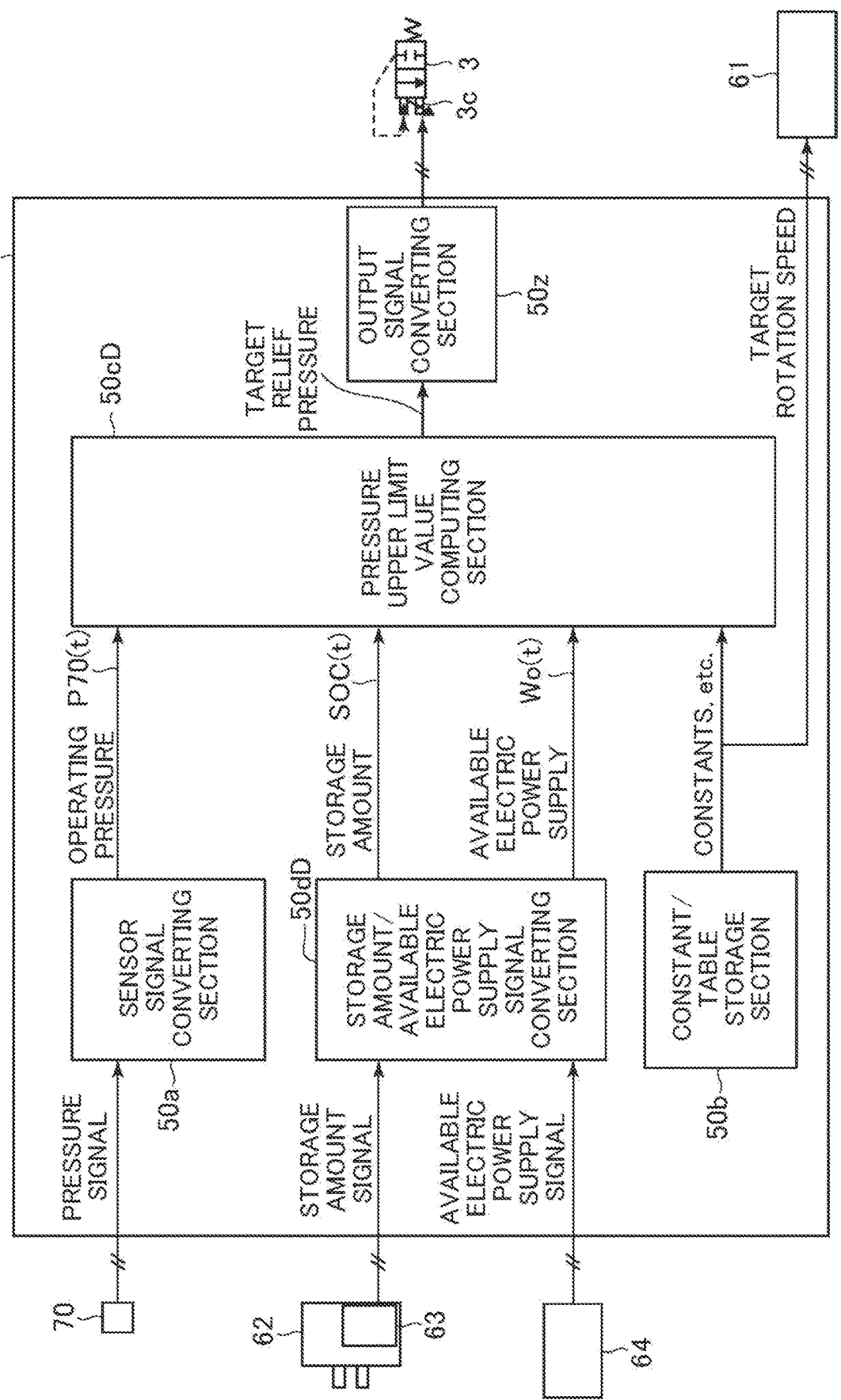
FIG. 24 is a block diagram illustrating functionalities of a controller in the third embodiment.

FIG. 24 is a block diagram illustrating functionalities of the controller 50D in the third embodiment.

In FIG. 24, the functionalities of the controller 50D in the third embodiment are different from the first embodiment in that: a storage amount/available electric power supply signal converting section 50dD is included instead of the storage amount signal converting section 50d, and the storage amount/available electric power supply signal converting section 50dD calculates the storage amount on the basis of the storage amount signal transmitted from the battery control controller 63, and simultaneously calculates the available electric power supply Wo(t) on the basis of the available electric power supply signal transmitted from the AC/DC converter 64; and a pressure upper limit value computing section 50cD is included instead of the pressure upper limit value computing section 50c, and the pressure upper limit value computing section 50cD further receives the available electric power supply Wo(t) transmitted from the storage amount/available electric power supply signal converting section 50dD also, and computes the target relief pressure.

Figure 25:
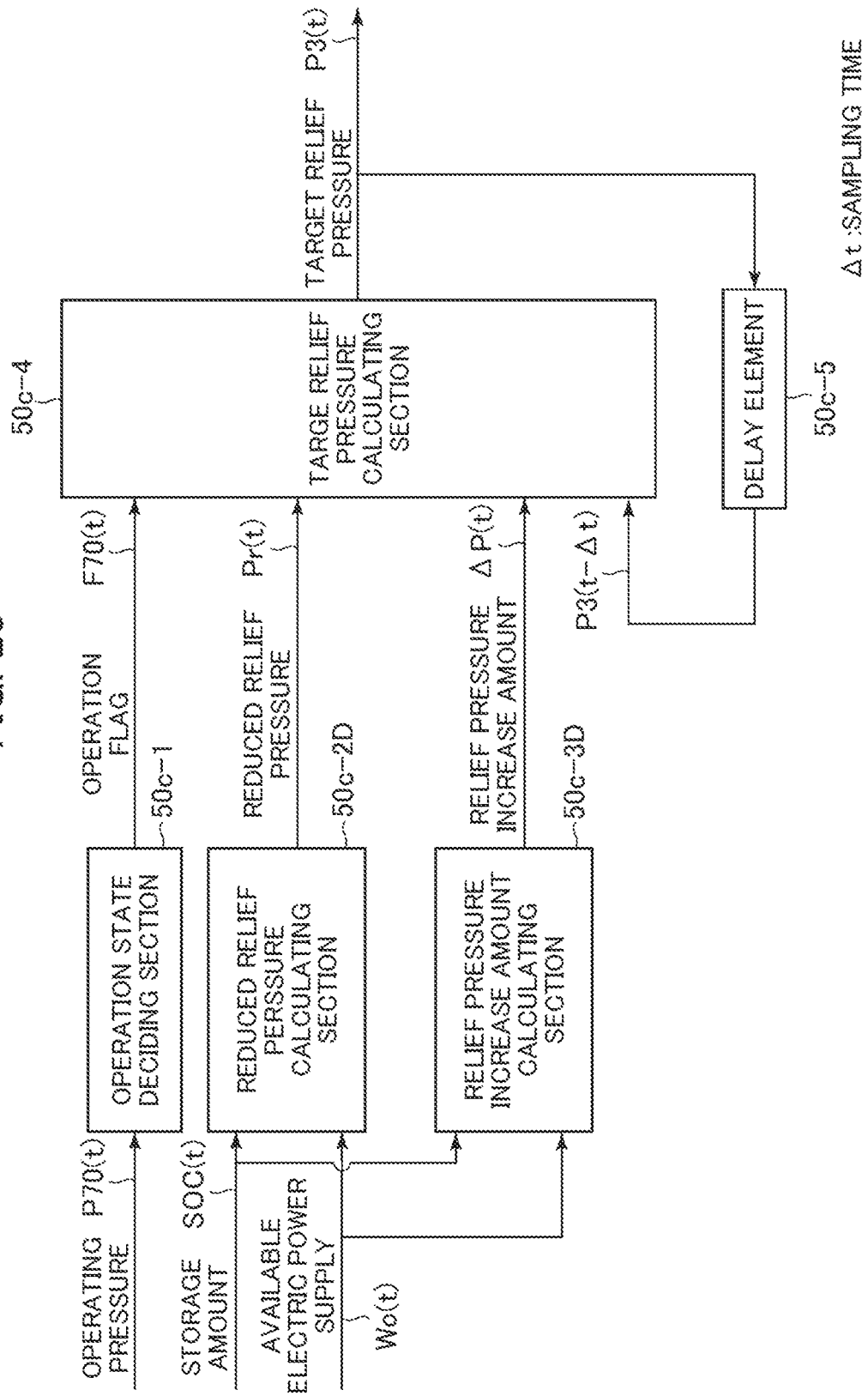
FIG. 25 is a block diagram illustrating functionalities of a pressure upper limit value computing section in the third embodiment.

FIG. 25 is a block diagram illustrating functionalities of the pressure upper limit value computing section 50cD in the third embodiment.

In FIG. 25, the pressure upper limit value computing section 50cD in the third embodiment is different from the first embodiment in that: a reduced relief pressure calculating section 50c-2D is included instead of the reduced relief pressure calculating section 50c-2, and the reduced relief pressure calculating section 50c-2D calculates the reduced relief pressure Pr(t) from the storage amount SOC(t) and the available electric power supply Wo(t); and a relief pressure increase amount calculating section 50c-3D is included instead of the relief pressure increase amount calculating section 50c-3, and the relief pressure increase amount calculating section 50c-3D calculates the relief pressure increase amount ΔP(t) from the storage amount SOC(t) and the available electric power supply Wo(t).

Figure 26:
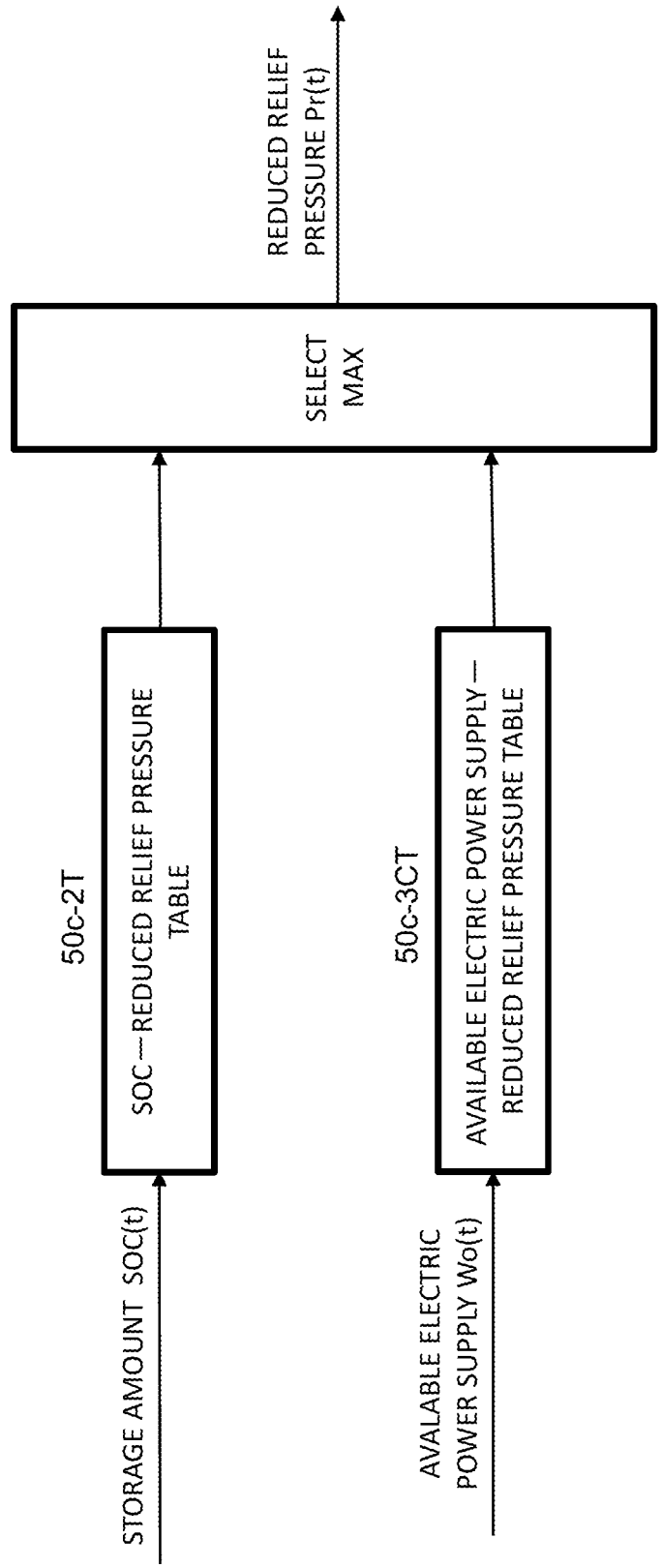
FIG. 26 is a figure illustrating a calculation flow of a reduced relief pressure calculating section in the third embodiment.

FIG. 26 is a figure illustrating a calculation flow of the reduced relief pressure calculating section 50c-2D in the third embodiment.

In FIG. 26, the reduced relief pressure calculating section 50c-2D in the third embodiment is different from the first embodiment in that the storage amount SOC(t) is input to the SOC—reduced relief pressure table 50c-2T, the available electric power supply Wo(t) is input to the available electric power supply—reduced relief pressure table 50c-2CT, and a larger one of output values from the two tables 50c-2T and 50c-2CT is output as the reduced relief pressure Pr(t). Thereby, for example, when the available electric power supply Wo(t) is small, but the storage amount SOC(t) is large, the normal relief pressure Pn is set to the reduced relief pressure Pr(t), and it becomes possible to not allow the relief pressure to be reduced.

Figure 27:
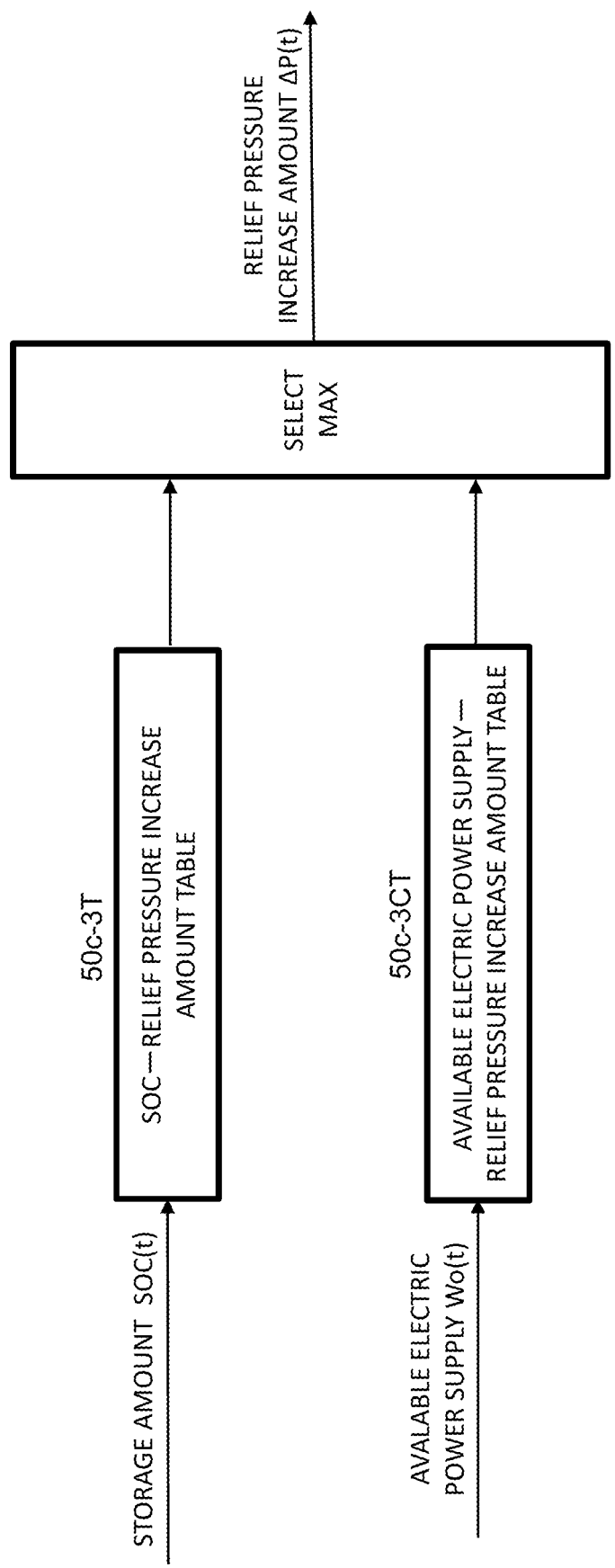
FIG. 27 is a figure illustrating a calculation flow of a relief pressure increase amount calculating section in the third embodiment.

FIG. 27 is a figure illustrating a calculation flow of the relief pressure increase amount calculating section 50c-3D in the third embodiment.

In FIG. 27, the relief pressure increase amount calculating section 50c-3D in the third embodiment is different from the first embodiment in that the storage amount SOC(t) is input to the SOC—relief pressure increase amount table 50c-3T, the available electric power supply Wo(t) is input to the available electric power supply—relief pressure increase amount table 50c-3CT, and a larger one of output values from the two tables 50c-3T and 50c-3CT is output as the relief pressure increase amount ΔP(t). Thereby, for example, when the available electric power supply Wo(t) is small, but the storage amount SOC(t) is large, it becomes possible to set a larger increase amount of the relief pressure.

According to the third embodiment, in the electrically driven construction machine including the electric power sources of both the first embodiment and the second embodiment, it is possible to use the battery 62 in an appropriate state, prevent deterioration of the battery 62, and it is possible to use the AC/DC converter 64 in an appropriate voltage range (appropriate state) and actuate the AC/DC converter 64 (device) appropriately.

Fourth Embodiment

A fourth embodiment of the present invention is explained by using FIG. 28 to FIG. 32. Note that explanations about portions that are similar to their counterparts in the first embodiment are omitted.

Figure 28:
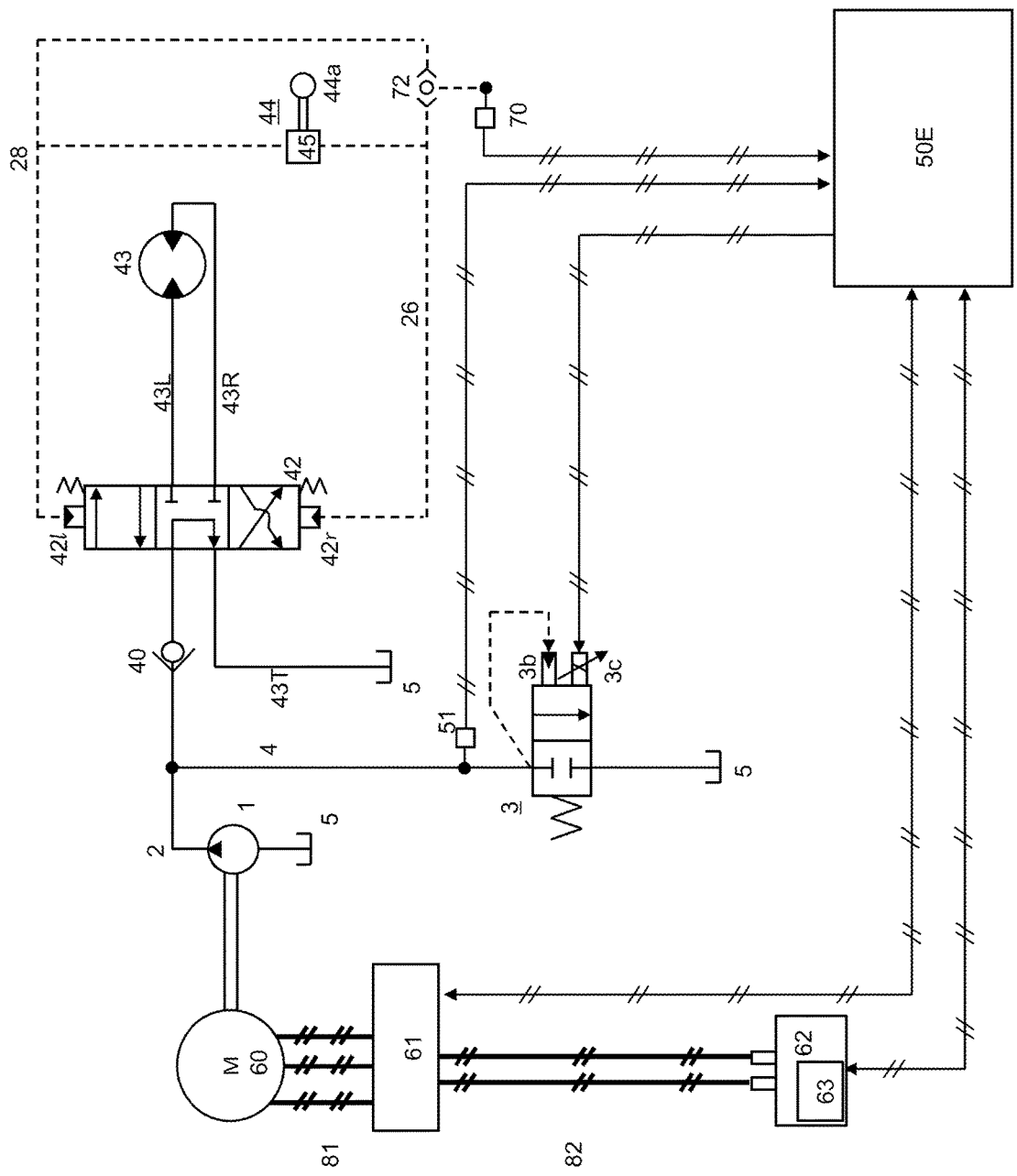
FIG. 28 is a figure illustrating the driving system according to a fourth embodiment of the present invention.

FIG. 28 is a figure illustrating the driving system according to the fourth embodiment. In FIG. 28, the driving system of the fourth embodiment is different from the first embodiment in that: the relief hydraulic line 4 is connected with the pressure sensor 51 that senses the delivery pressure of the hydraulic pump 1; and the pressure sensor 51 is electrically connected with a controller 50E, and a pressure signal transmitted by the pressure sensor 51 is received by the controller 50E.

The controller 50E decides whether or not the difference between the current value (the target relief pressure sensed one sampling time before) P3($t-\Delta t$) of the target relief pressure and the delivery pressure P51($t$) of the hydraulic pump 1 sensed by the pressure sensor 51 is smaller than a preset decision differential pressure (upper limit pressure reaching differential pressure decision value) Pd, and, when the difference between the current value P3($t-\Delta t$) of the target relief pressure and the delivery pressure P51($t$) of the hydraulic pump 1 is equal to or larger than the decision differential pressure Pd, sets the target relief pressure P3($t$) to the current value P3($t-\Delta t$) of the target relief pressure at that time.

Figure 29:
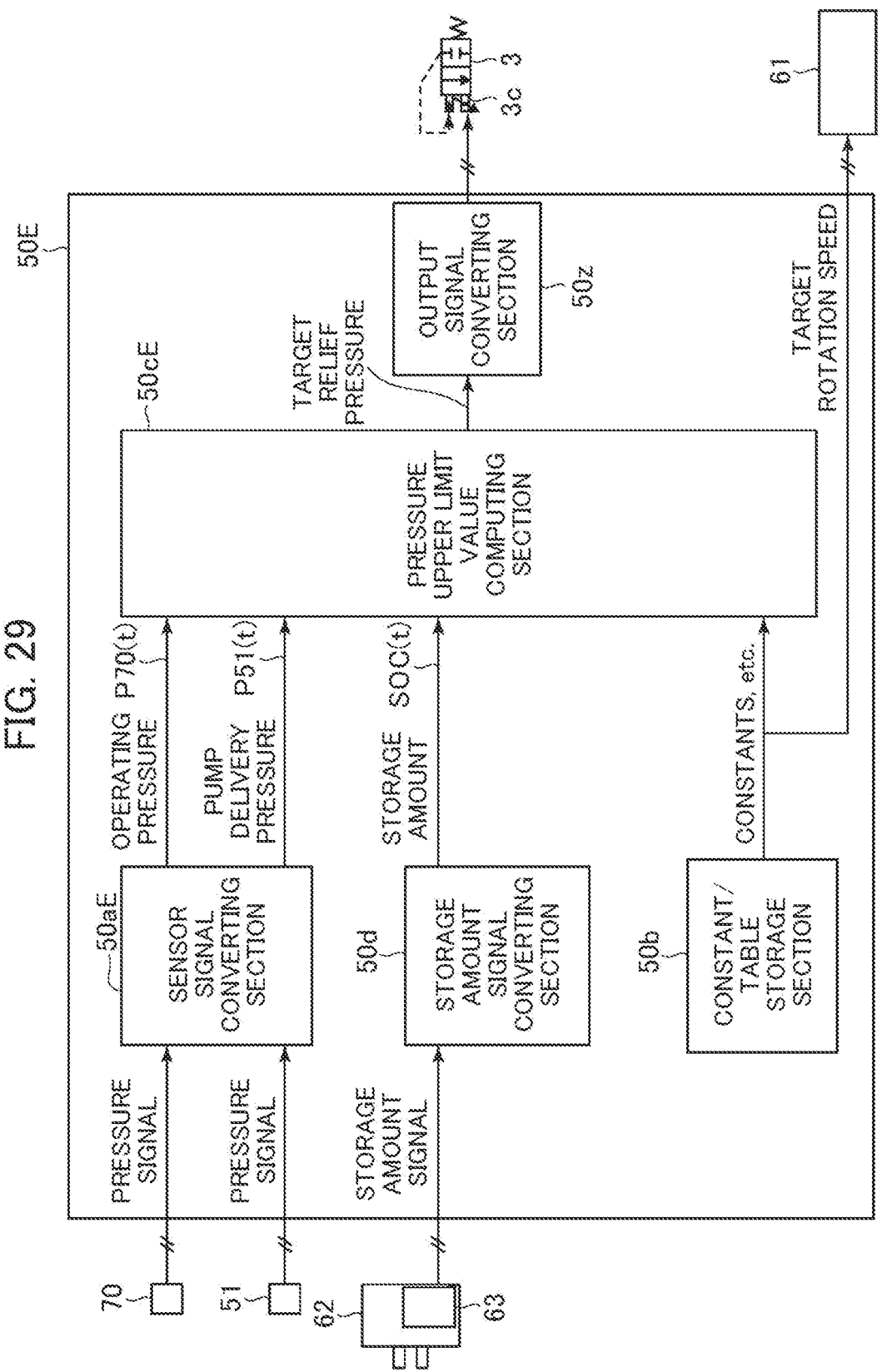
FIG. 29 is a block diagram illustrating functionalities of a controller in the fourth embodiment.

FIG. 29 is a block diagram illustrating functionalities of the controller 50E in the fourth embodiment.

In FIG. 29, the functionalities of the controller 50E in the fourth embodiment are different from the first embodiment in that: a sensor signal converting section 50aE is included instead of the sensor signal converting section 50a, and the sensor signal converting section 50aE receives signals sent from the pressure sensor 70 and the pressure sensor 51, and, on the basis of the signals, calculates the operating pressure P70(t) and a delivery pressure (pump delivery pressure) P51(t) of the hydraulic pump 1; and a pressure upper limit value computing section 50cE is included instead of the pressure upper limit value computing section 50c, and the pressure upper limit value computing section 50cE receives the operating pressure P70(t) and the pump delivery pressure P51(t) transmitted from the sensor signal converting section 50aE, the storage amount SOC(t) transmitted from storage amount signal converting section 50d, and constant information and table information transmitted from the constant/table storage section 50b, and computes the target relief pressure.

Figure 30:
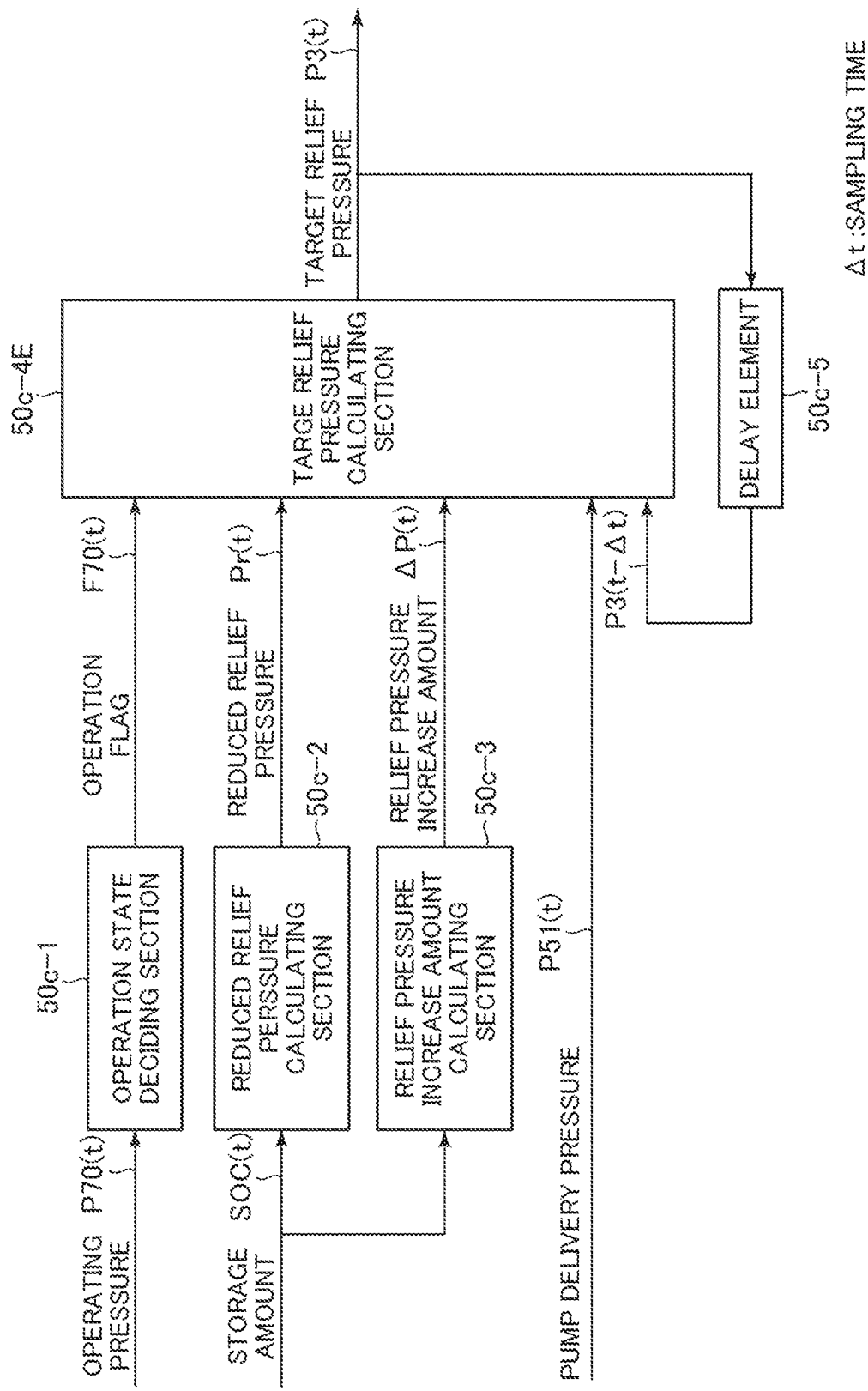
FIG. 30 is a block diagram illustrating functionalities of a pressure upper limit value computing section in the fourth embodiment.

FIG. 30 is a block diagram illustrating functionalities of the pressure upper limit value computing section 50cE in the fourth embodiment.

In FIG. 30, the functionalities of the pressure upper limit value computing section 50cE in the fourth embodiment are different from the first embodiment in that a target relief pressure calculating section 50c-4E is included instead of the target relief pressure calculating section 50c-4, and the target relief pressure calculating section 50c-4E further receives the pump delivery pressure P51(t) and calculates the target relief pressure P3(t).

Figure 31:
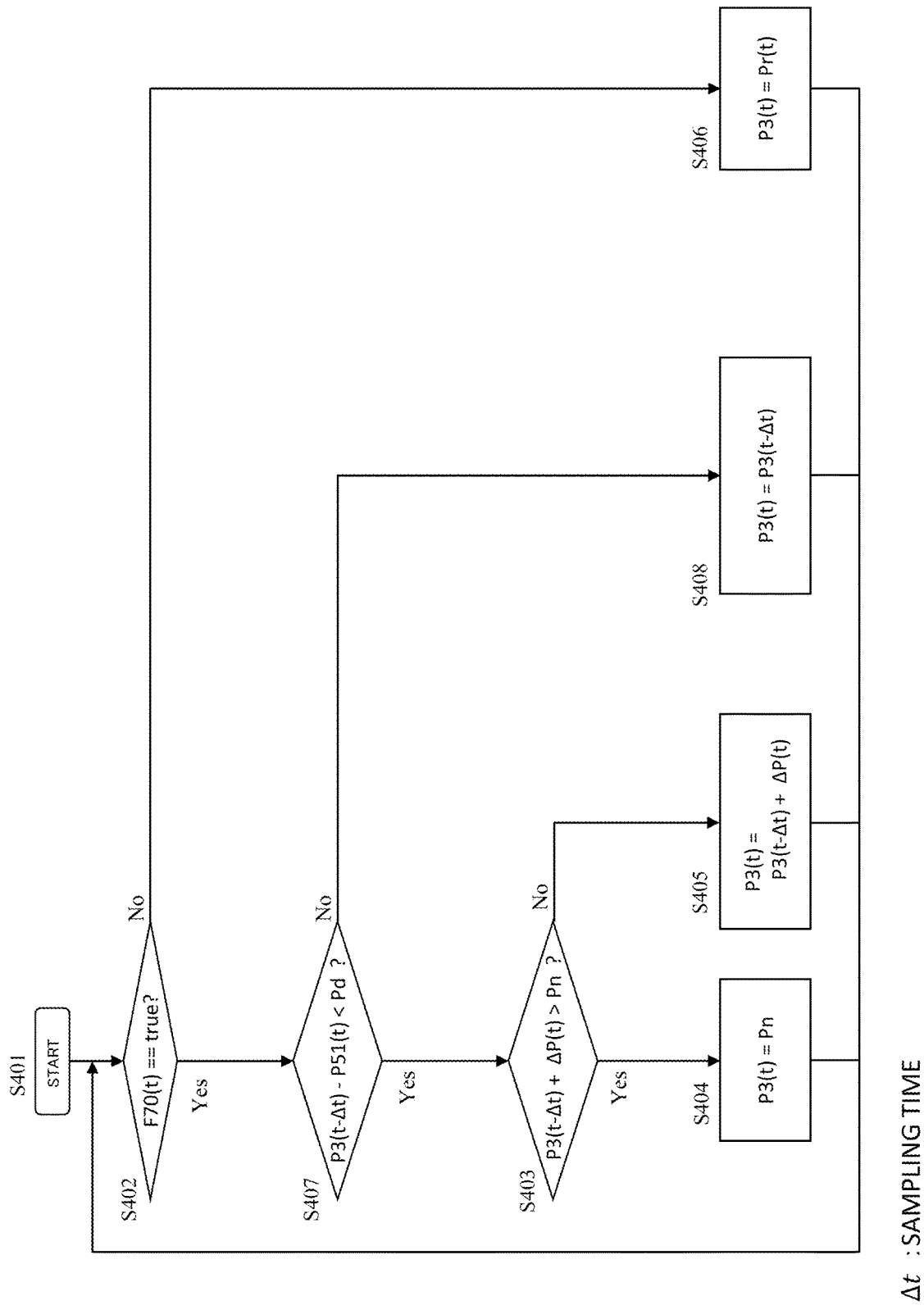
FIG. 31 is a flowchart illustrating a calculation flow of a target relief pressure calculating section in the fourth embodiment.

FIG. 31 is a flowchart illustrating a calculation flow of the target relief pressure calculating section 50c-4E in the fourth embodiment.

In FIG. 31, the calculation flow of the target relief pressure calculating section 50c-4E in the fourth embodiment is different from the first embodiment in that, when the result of the decision at Yes at Step S402, the procedure proceeds to a process at Step SS407, not Step S403.

At Step S407, the target relief pressure calculating section 50c-4E decides whether the difference between the pump delivery pressure P51(t) and the target relief pressure P3(t-Δt) sensed one sampling time before is smaller than the upper limit pressure reaching differential pressure decision value (hereinafter, referred to as a decision differential pressure) Pd. When the difference between the target relief pressure P3(t-Δt) and the pump delivery pressure P51(t) is smaller than the decision differential pressure Pd, the result of the decision by the target relief pressure calculating section 50c-4E is Yes, and the procedure proceeds to the process at Step S403. When the difference between the target relief pressure P3(t-Δt) and the pump delivery pressure P51(t) is equal to or larger than the decision differential pressure Pd, the result of the decision by the target relief pressure calculating section 50c-4E is No, and the procedure proceeds to a process at Step S408.

At Step S408, the target relief pressure calculating section 50c-4E sets the target relief pressure P3(t) to the target relief pressure P3(t-Δt) sensed one sampling time before. Then, the target relief pressure calculating section 50c-4E outputs the target relief pressure P3(t) to the output signal converting section 50z.

Next, advantages of the fourth embodiment are explained by using a transition example of a pump delivery pressure and pump output power.

Figure 32:
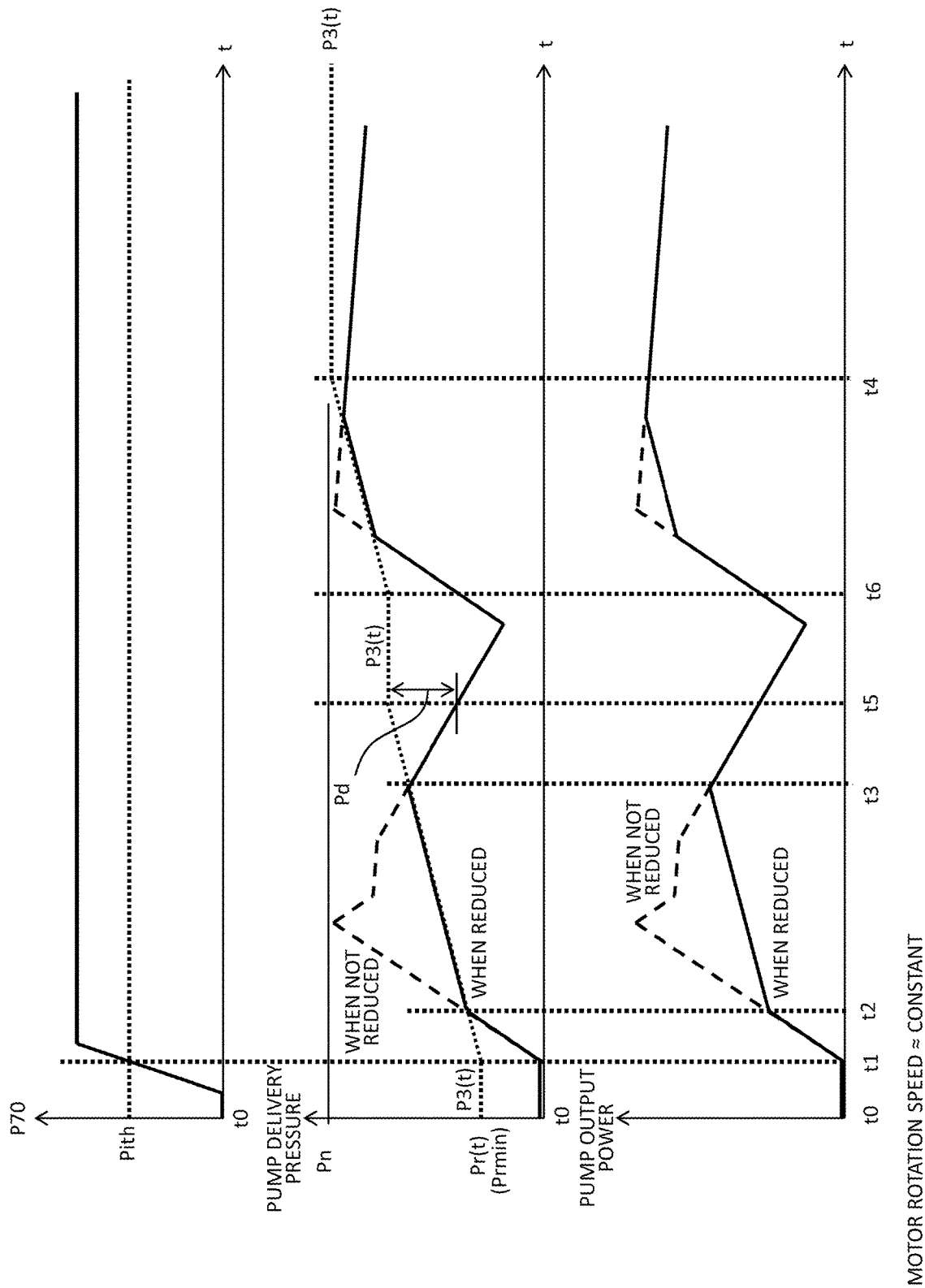
FIG. 32 is a figure illustrating a transition example of a pump delivery pressure and pump output power in the fourth embodiment.

FIG. 32 is a figure illustrating a transition example of a pump delivery pressure and pump output power in the fourth embodiment. In FIG. 32, the top graph illustrates temporal changes in the operating pressure P70(t), the middle graph illustrates temporal changes in the pump delivery pressure, and the bottom graph illustrates pump output power (the output power of the hydraulic pump 1).

In addition, as in the case illustrated about the first embodiment, in the following case explained, the storage amount SOC(t) is small, and is, for example, Sa in FIG. 7 and FIG. 8, the reduced relief pressure Pr(t) is the minimum relief pressure Prmin, the relief pressure increase amount ΔP(t) is the value ΔPa between the maximum relief pressure increase amount ΔPmax and the minimum relief pressure increase amount ΔPmin.

Similar to the first embodiment: at time t1, the operating pressure P70(t) becomes higher than the threshold Pith, and the pump delivery pressure starts increasing; at time t2, the pump delivery pressure matches the target relief pressure P3(t2) at that time point; and, at time t3, the pressure in a case where the control of the present invention is not being performed matches the target relief pressure P3(t3) at that time point.

At time t5, the difference between a target relief pressure P3(t5) and a pump delivery pressure P51(t5) becomes equal to or larger than the decision differential pressure Pd. From this time point, the result of the decision at Step S407 in FIG. 31 is No, and the procedure proceeds to the process at Step S408. As a result of the process at Step S408, the target relief pressure P3(t) becomes the target relief pressure P3(t-Δt) sensed one sampling time before, and the target relief pressure is kept at the constant value. This process is continued until a time point at which the difference between the target relief pressure P3(t5) and the pump delivery pressure P51(t5) becomes smaller than the decision differential pressure Pd at time t6.

Since the difference between the target relief pressure P3(t) and the pump delivery pressure P51(t) becomes smaller than the decision differential pressure Pd from time t6 on, the target relief pressure starts increasing as a result of the process at Step S405. After the target relief pressure P3(t) becomes higher than the normal relief pressure Pn at time t4, the target relief pressure P3(t) is set to Pn as a result of the process at Step S404.

In the manner mentioned above, in the fourth embodiment also, advantages which are the same as those in the first embodiment can be attained. In addition, in the fourth embodiment, an increase in the pump delivery pressure is reduced also when the pump delivery pressure almost starts increasing rapidly again after the pump delivery pressure lowers temporarily; as a result, it is possible to reduce an increase in the pump output power, and consequently an increase in the electric power consumption of the electric motor 60 that are caused by an increase in the pump delivery pressure, and to use the battery 62 in a more appropriate state.

Fifth Embodiment

A fifth embodiment of the present invention is explained by using FIG. 33 to FIG. 36. Note that explanations about portions that are similar to their counterparts in the fourth embodiment are omitted.

The configuration of the driving system in the fifth embodiment is the same as the fourth embodiment illustrated in FIG. 28. It should be noted that the controller 50E is changed to a controller 50F.

The controller 50F decides whether or not the difference between the current value (the target relief pressure sensed one sampling time before) P3($t-\Delta t$) of the target relief pressure and the delivery pressure P51($t$) of the hydraulic pump 1 sensed by the pressure sensor 51 is smaller than the preset decision differential pressure Pd, and, when the difference between the current value P3($t-\Delta t$) of the target relief pressure and the delivery pressure P51($t$) of the hydraulic pump 1 is equal to or larger than the decision differential pressure Pd, sets the target relief pressure P3($t$) to a value obtained by adding the decision differential pressure Pd to the delivery pressure P51($t$) of the hydraulic pump 1 until the target relief pressure P3($t$) lowers to a second relief pressure (reduced relief pressure) Pr(t).

Figure 33:
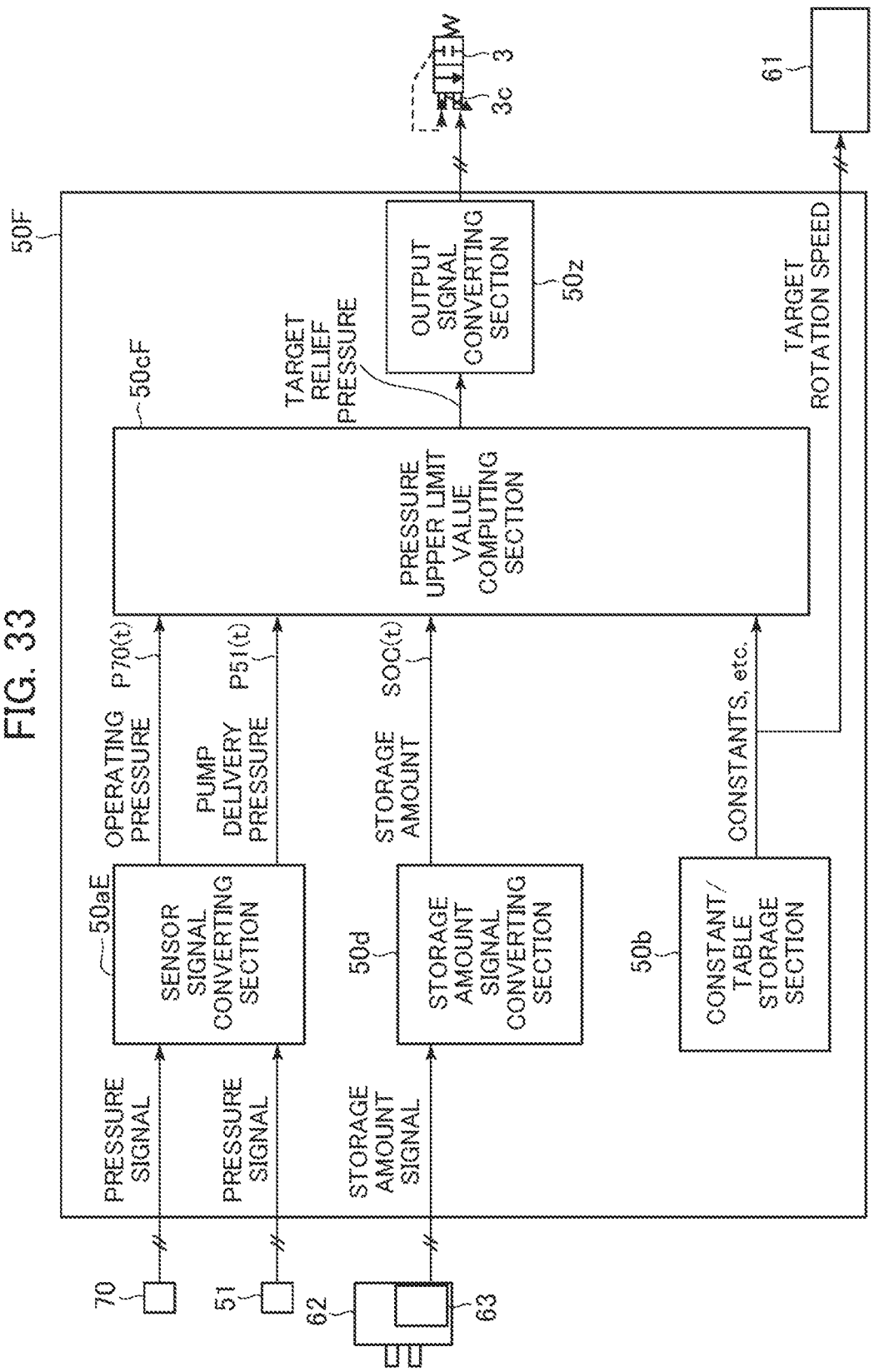
FIG. 33 is a block diagram illustrating functionalities of a controller in a fifth embodiment of the present invention.

FIG. 33 is a block diagram illustrating functionalities of the controller 50F in the fifth embodiment.

In FIG. 33, the functionalities of the controller 50F in the fifth embodiment are different from the fourth embodiment in that a pressure upper limit value computing section 50cF is included instead of the pressure upper limit value computing section 50cE, and some of the functionalities of the pressure upper limit value computing section 50cF are different.

Figure 34:
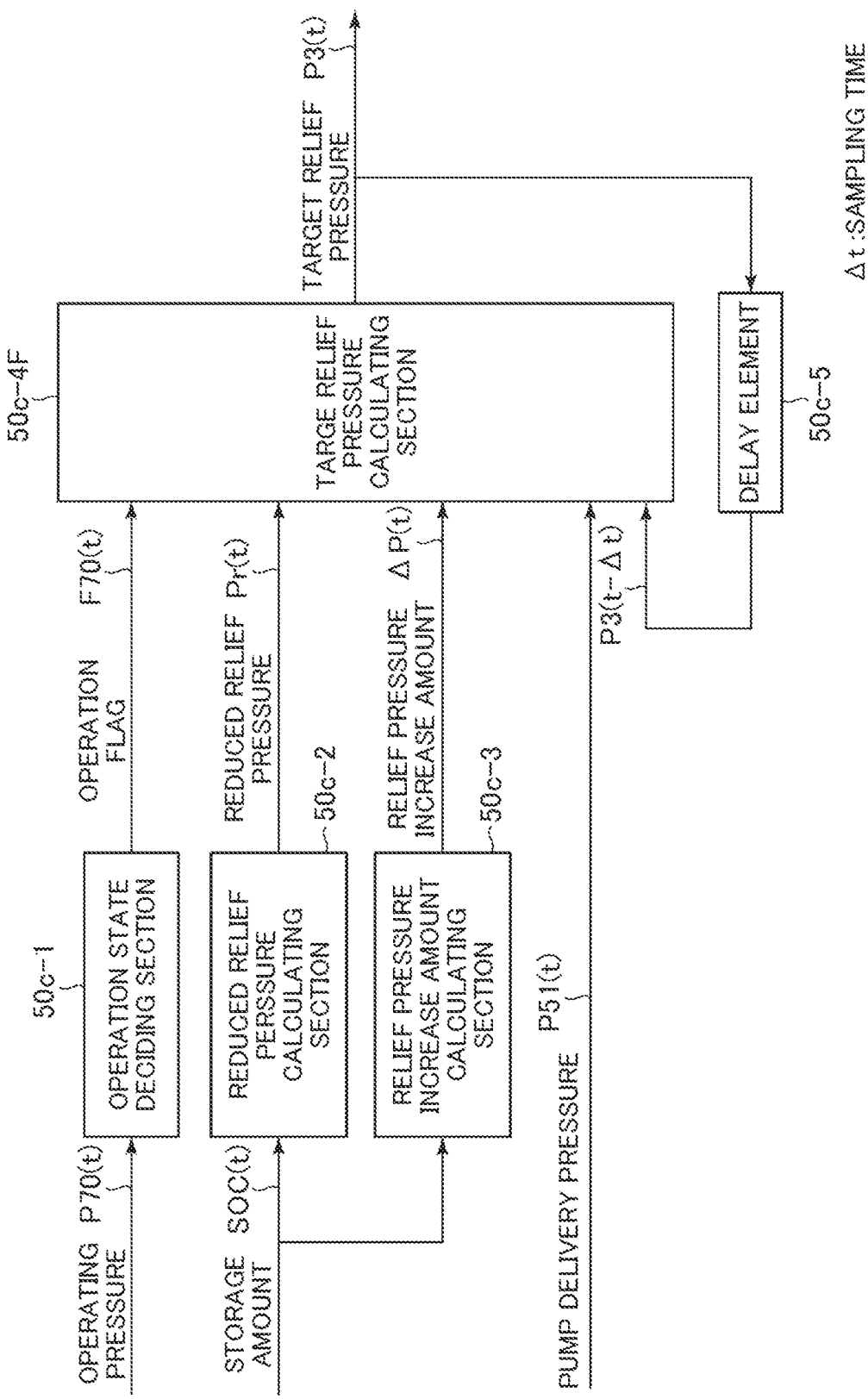
FIG. 34 is a block diagram illustrating functionalities of a pressure upper limit value computing section in the fifth embodiment.

FIG. 34 is a block diagram illustrating functionalities of the pressure upper limit value computing section 50cF in the fifth embodiment.

In FIG. 34, the functionalities of the pressure upper limit value computing section 50cF in the fifth embodiment are different from the fourth embodiment in that a target relief pressure calculating section 50c-4F is included instead of the target relief pressure calculating section 50c-4E, and the target relief pressure calculating section 50c-4F uses a different method of calculating the target relief pressure P3($t$).

Figure 35:
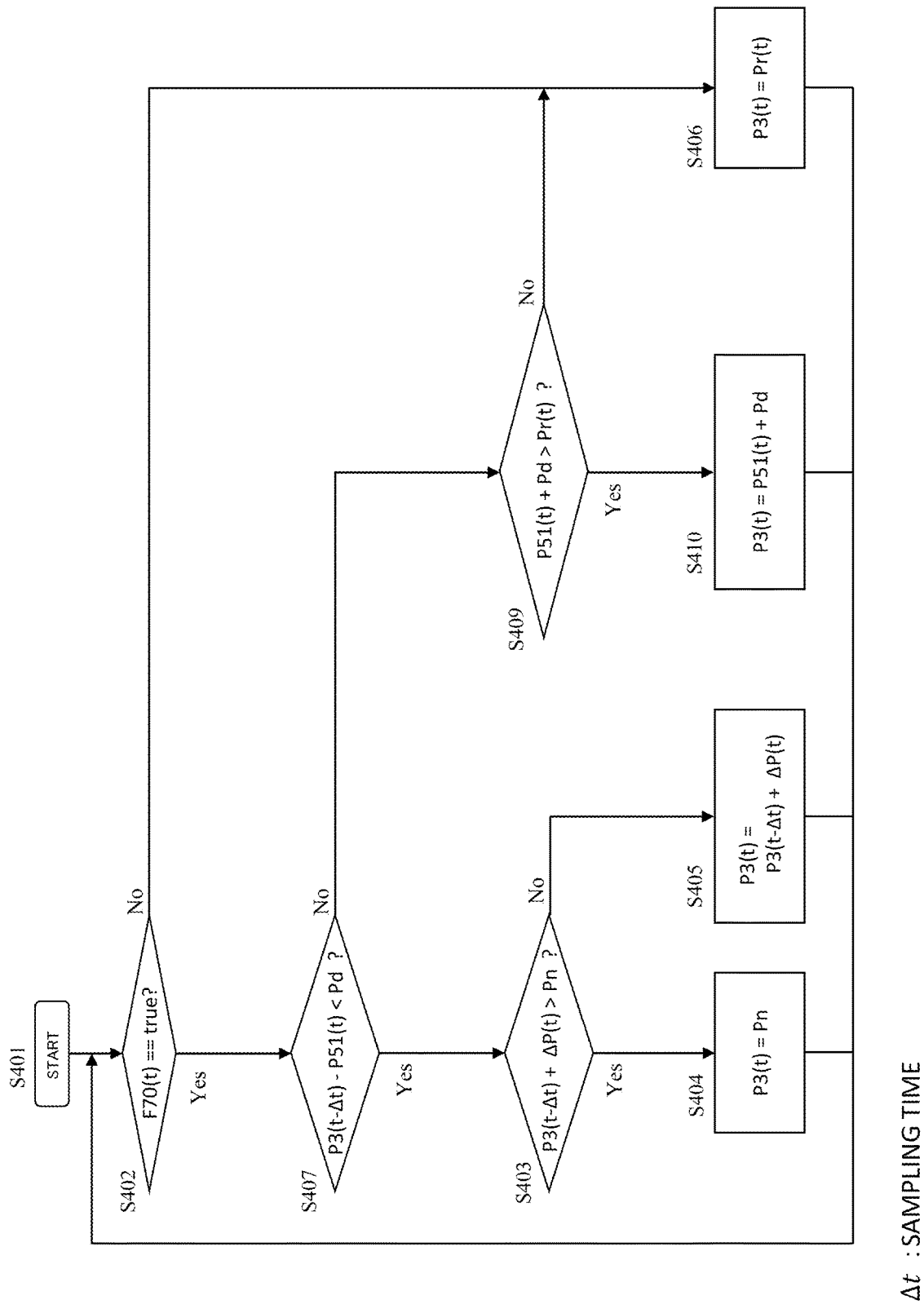
FIG. 35 is a flowchart illustrating a calculation flow of a target relief pressure calculating section in the fifth embodiment.

FIG. 35 is a flowchart illustrating a calculation flow of the target relief pressure calculating section 50c-4F in the fifth embodiment.

In FIG. 35, the calculation flow of the target relief pressure calculating section 50c-4F in the fifth embodiment is different from the fourth embodiment in that, when the result of the decision at Step S407 is No, the procedure proceeds to a process at Step S409, not Step S408.

At Step S409, the target relief pressure calculating section 50c-4F decides whether the sum of the pump delivery pressure P51($t$) and the decision differential pressure Pd is larger than the reduced relief pressure Pr(t) at this time point. When the sum of the pump delivery pressure P51($t$) and the decision differential pressure Pd is larger than the reduced relief pressure Pr(t) at this time point, the result of the decision by the target relief pressure calculating section 50c-4F is Yes, and the procedure proceeds to a process at Step S410. When the sum of the pump delivery pressure P51($t$) and the decision differential pressure Pd is equal to or smaller than the reduced relief pressure Pr(t) at this time point, the result of the decision by the target relief pressure calculating section 50c-4F is No, and the target relief pressure calculating section 50c-4F proceeds to the process at Step S406.

At Step S410, the target relief pressure calculating section 50c-4F sets the target relief pressure P3($t$) to the sum of the pump delivery pressure P51($t$) and the decision differential pressure Pd. Then, the target relief pressure calculating section 50c-4F outputs the target relief pressure P3($t$) to the output signal converting section 50z.

Next, advantages of the fifth embodiment are explained by using a transition example of a pump delivery pressure and pump output power.

Figure 36:
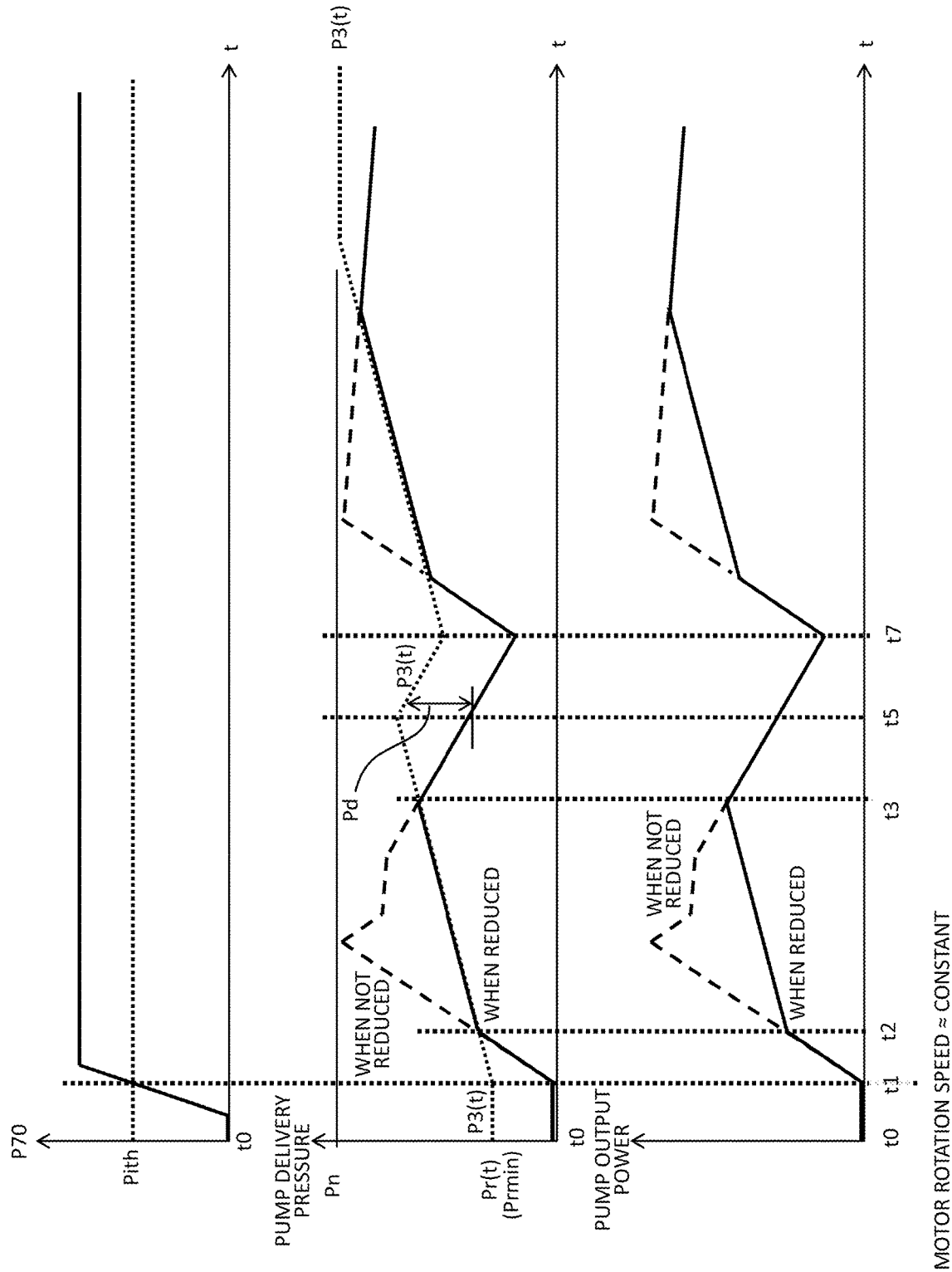
FIG. 36 is a figure illustrating a transition example of a pump delivery pressure and pump output power in the fifth embodiment.

FIG. 36 is a figure illustrating a transition example of a pump delivery pressure and pump output power in the fifth embodiment. In FIG. 36, the top graph illustrates temporal changes in the operating pressure P70($t$), the middle graph illustrates temporal changes in the pump delivery pressure, and the bottom graph illustrates pump output power (the output power of the hydraulic pump 1).

In addition, as in the case illustrated about the first and fourth embodiments, in the following case explained, the storage amount SOC(t) is small and is, for example, Sa in FIG. 7 and FIG. 8, the reduced relief pressure Pr(t) is the minimum relief pressure Prmin, and the relief pressure increase amount $\Delta P(t)$ is the value $\Delta Pa$ between the maximum relief pressure increase amount $\Delta Pmax$ and the minimum relief pressure increase amount $\Delta Pmin$.

Similar to the fourth embodiment: at time t1, the operating pressure P70($t$) becomes higher than the threshold Pith, and the pump delivery pressure starts increasing; at time t2, the pump delivery pressure matches the target relief pressure P3($t2$) at that time point; and, at time t3, the pressure in a case where the control of the present invention is not being performed matches the target relief pressure P3($t3$) at that time point.

At time t5, the difference between the target relief pressure P3($t5$) and the pump delivery pressure P51($t5$) becomes equal to or larger than the decision differential pressure Pd. From this time point, the result of the decision at Step S407 in FIG. 35 is No, the procedure proceeds to the process at Step S409, the result of the decision at Step S409 is Yes, and the procedure proceeds to the process at Step S410. As a result of the process at Step S410, the target relief pressure P3($t$) becomes the sum of the pump delivery pressure P51($t$) and the decision differential pressure Pd. As a result, the target relief pressure becomes a value which is the constant value higher than P51($t$).

At time t7, the pump delivery pressure P51($t$) starts increasing. Since then the difference between the target relief pressure P3($t$) and the pump delivery pressure P51($t$) becomes smaller than the decision differential pressure Pd, the result of the decision at Step S407 is Yes, the procedure proceeds to the process at Step S403, the result of the decision at Step S403 is No, and the procedure proceeds to the process at Step S405. As a result, the target relief pressure P3($t$) is set to the sum of $\Delta P(t)$ and the target relief pressure P3($t-\Delta t$) sensed one sampling time before.

In the manner mentioned above, in the fifth embodiment also, advantages which are the same as those in the first embodiment can be attained. In addition, in the fifth embodiment, an increase in the pump delivery pressure is reduced further as compared to the fourth embodiment when the pump delivery pressure almost starts increasing rapidly again after the pump delivery pressure lowers temporarily; as a result, it is possible to reduce an increase in the pump output power, and consequently an increase in the electric power consumption of the electric motor 60 that are caused by an increase in the pump delivery pressure, and to use the battery 62 in a more appropriate state.

DESCRIPTION OF REFERENCE CHARACTERS

1: Fixed displacement hydraulic pump
1A: Variable displacement hydraulic pump
2: Hydraulic line
3: Relief valve
4: Relief hydraulic line
5: Tank
30, 30A: Regulator 42: Directional control valve
43: Hydraulic motor (actuator)
44: Operation lever device
45: Pilot valve
50, 50C, 50D, 50E, 50F: Controller
51: Pressure sensor
60: Electric motor
61: Inverter
62: Battery (storage apparatus)
63: Battery control controller
64: AC/DC converter (external electric power converting apparatus)
65: External power source
66: External battery
70: Pressure sensor (operation state sensor)
72: Shuttle valve

The invention claimed is:

1. An electrically driven hydraulic construction machine comprising:
    a hydraulic pump;
    an actuator driven by a hydraulic fluid delivered from the hydraulic pump;
    an operation lever device that instructs an operation speed and direction of the actuator;
    an operation state sensor that acquires operation state information about the operation lever device;
    a relief valve that is connected to a hydraulic line connecting the hydraulic pump with the actuator, and discharges the hydraulic fluid in the hydraulic line to a tank when a pressure in the hydraulic line has reached a preset target relief pressure; and
    an electric motor that is supplied with electric power from an electric power source, and drives the hydraulic pump, wherein
    the electrically driven hydraulic construction machine further comprises a controller that changes the target relief pressure of the relief valve on a basis of the operation state information and a state quantity of the electric power source, and
    the controller is configured to
    set the target relief pressure to a first relief pressure when the operation lever device is not being operated and the state quantity of the electric power source is equal to or larger than a preset threshold, and to set the target relief pressure to a second relief pressure lower than the first relief pressure when the operation lever device is not being operated and the state quantity of the electric power source is smaller than the threshold.

2. The electrically driven hydraulic construction machine according to claim 1, wherein
    the controller is further configured to
    make the target relief pressure the first relief pressure by increasing the target relief pressure at a predetermined rate in a case in which the operation lever device is operated to start driving the actuator when the target relief pressure is the second relief pressure.

3. The electrically driven hydraulic construction machine according to claim 2, wherein
    the controller is further configured to
    calculate a relief pressure increase amount that decreases as the state quantity of the electric power source decreases for each predetermined time, and make the target relief pressure the first relief pressure by adding the relief pressure increase amount to a current value of the target relief pressure, and increasing the target relief pressure at a predetermined rate in a case in which the operation lever device is operated to start driving the actuator when the target relief pressure is the second relief pressure.

4. The electrically driven hydraulic construction machine according to claim 2, further comprising:
    a pressure sensor that senses a delivery pressure of the hydraulic pump, wherein
    the controller is configured to
    set the target relief pressure to a current value of the target relief pressure when a difference between the current value of the target relief pressure and the delivery pressure of the hydraulic pump sensed by the pressure sensor is equal to or larger than a preset decision differential pressure.

5. The electrically driven hydraulic construction machine according to claim 2, further comprising:
    a pressure sensor that senses a delivery pressure of the hydraulic pump, wherein
    the controller is configured to
    set the target relief pressure to a value obtained by adding a preset decision differential pressure to the delivery pressure of the hydraulic pump until the target relief pressure lowers to the second relief pressure when a difference between a current value of the target relief pressure and the delivery pressure of the hydraulic pump sensed by the pressure sensor is equal to or larger than the decision differential pressure.

6. The electrically driven hydraulic construction machine according to claim 1, wherein
    the electric power source is a storage apparatus that stores electric power,
    the state quantity of the electric power source is a storage amount of the storage apparatus, and
    the controller is configured to calculate the storage amount on a basis of a storage amount signal transmitted from the storage apparatus.

7. The electrically driven hydraulic construction machine according to claim 1, wherein
    the electric power source is an external electric power converting apparatus that converts electric power supplied from an outside of a machine body, and supplies the electric power to the electric motor,
    the state quantity of the electric power source is an available electric power supply of the external electric power converting apparatus, and
    the controller is configured to calculate the available electric power supply on a basis of an electric power signal transmitted from the external electric power converting apparatus.

8. The electrically driven hydraulic construction machine according to claim 1, wherein
    the electric power source is an external electric power supplying apparatus that is installed outside a machine body, and supplies electric power to the electric motor,
    the state quantity of the electric power source is an available electric power supply of the external electric power supplying apparatus, and
    the controller is configured to calculate the available electric power supply on a basis of an electric power signal transmitted from the external electric power supplying apparatus.

* * * * *